(12) United States Patent
Regnier et al.

(10) Patent No.: US 11,787,554 B2
(45) Date of Patent: Oct. 17, 2023

(54) AIRCRAFT AIRFRAMES HAVING INTEGRAL FUEL TANKS

(71) Applicant: Textron Innovations Inc., Providence, RI (US)

(72) Inventors: Bradley P. Regnier, Fort Worth, TX (US); Zachary E. Dailey, Grapevine, TX (US); Aaron Alexander Acee, Flower Mound, TX (US); Brian J. Cox, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/340,837

(22) Filed: Jun. 7, 2021

(65) Prior Publication Data
US 2022/0388628 A1 Dec. 8, 2022

(51) Int. Cl.
| | | |
|---|---|---|
| *B64D 37/04* | (2006.01) | |
| *B64C 3/34* | (2006.01) | |
| *B64C 1/06* | (2006.01) | |
| *B64C 29/00* | (2006.01) | |
| *B64D 37/30* | (2006.01) | |

(52) U.S. Cl.
CPC .............. *B64D 37/04* (2013.01); *B64C 1/06* (2013.01); *B64C 3/34* (2013.01); *B64C 29/0033* (2013.01); *B64D 37/30* (2013.01)

(58) Field of Classification Search
CPC ........ B64D 37/04; B64D 37/10; B64D 37/02; B64D 37/30; B64D 37/06; B64D 37/18; B64C 1/06; B64C 3/34
See application file for complete search history.

(56) References Cited

U.S. PATENT DOCUMENTS

| | | | | |
|---|---|---|---|---|
| 2,602,614 A | * | 7/1952 | Cole ...................... | B64D 37/04 52/84 |
| 5,673,939 A | * | 10/1997 | Bees ........................ | B60K 1/04 280/834 |

(Continued)

FOREIGN PATENT DOCUMENTS

| | | | | | |
|---|---|---|---|---|---|
| CN | 106628114 A | * | 5/2017 | ............. | B64C 3/182 |
| DE | 102015008178 A1 | * | 2/2017 | ............. | B64C 3/182 |

(Continued)

OTHER PUBLICATIONS

Translation of DE 102015008178 A1, Feb. 2, 2017 (Year: 2017).*

*Primary Examiner* — Joshua J Michener
*Assistant Examiner* — Ryan Andrew Yankey
(74) *Attorney, Agent, or Firm* — Lawrence Youst PLLC

(57) ABSTRACT

An aircraft includes a fuselage airframe and a wing airframe that is subject to flight loads. The fuselage airframe includes fore/aft floor beams having a plurality of floor intercostals laterally extending therebetween and fore/aft roof beams with a plurality of roof intercostals laterally extending therebetween. Each of a plurality of cabin frames extends generally vertically between respective floor and roof beams. The wing airframe includes forward and aft wing spars with a plurality of wing ribs extending therebetween. At least one fuel tank, that is configured to contain a pressurized fuel such as pressurized hydrogen fuel, integrally forms at least a portion of one of the beams, the intercostals, the frames, the spars and/or the ribs such that the fuel tank is subject to the flight loads.

14 Claims, 13 Drawing Sheets

(56) References Cited

U.S. PATENT DOCUMENTS

| | | | |
|---|---|---|---|
| 8,967,529 B1* | 3/2015 | Bennett | B64D 27/24 |
| | | | 446/57 |
| 11,217,839 B2* | 1/2022 | Zimmermann | H01M 50/522 |
| 11,316,224 B2* | 4/2022 | Zimmermann | H01M 10/6556 |
| 2009/0156076 A1* | 6/2009 | Toni | B64C 1/06 |
| | | | 428/221 |
| 2012/0248244 A1* | 10/2012 | Brownjohn | B64C 1/064 |
| | | | 244/118.5 |
| 2015/0041004 A1* | 2/2015 | Komoda | B64C 3/34 |
| | | | 137/565.01 |
| 2020/0277069 A1 | 9/2020 | Rainville et al. | |
| 2020/0313209 A1* | 10/2020 | Rainville | F17C 1/14 |
| 2020/0384719 A1* | 12/2020 | Benson | B32B 5/022 |
| 2021/0107618 A1* | 4/2021 | Carlson | B64C 1/069 |
| 2021/0300581 A1* | 9/2021 | Peacock | B64D 37/02 |

FOREIGN PATENT DOCUMENTS

| | | | | |
|---|---|---|---|---|
| DE | 102020105406 A1 * | 9/2021 | | B64D 37/02 |
| EP | 3378788 A1 * | 9/2018 | | B64C 1/06 |
| EP | 3524526 A1 * | 8/2019 | | B64C 1/061 |
| EP | 3547388 A1 * | 10/2019 | | B64D 37/02 |
| GB | 2604141 A * | 8/2022 | | B64C 3/18 |
| WO | WO-2021122542 A1 * | 6/2021 | | B64C 3/182 |

* cited by examiner

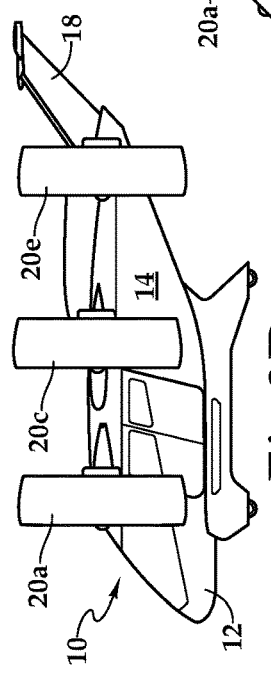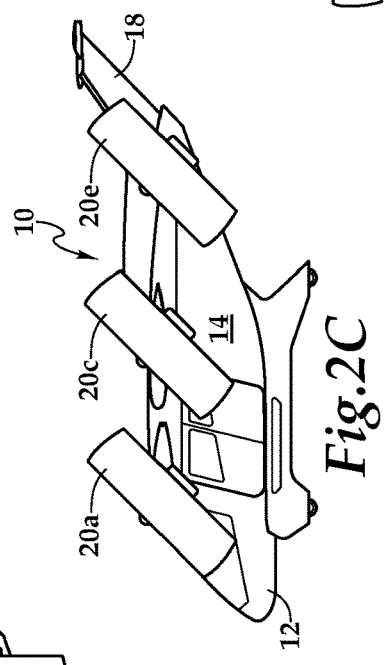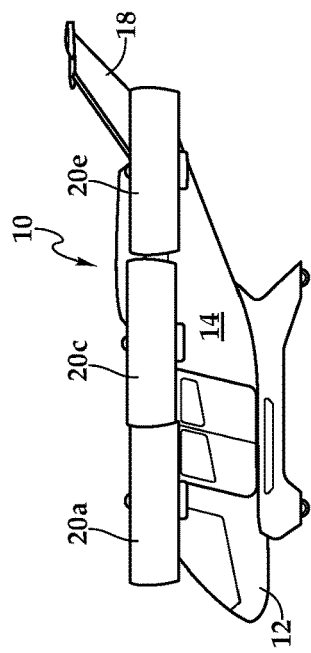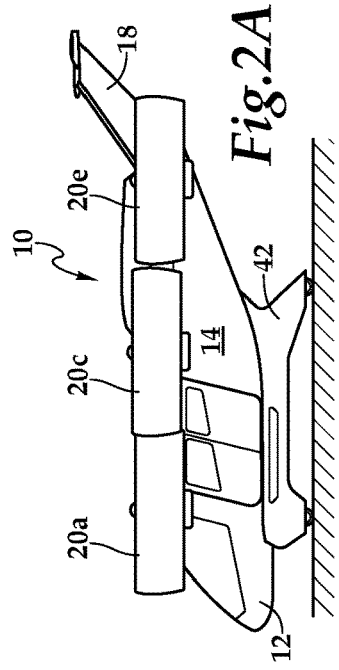

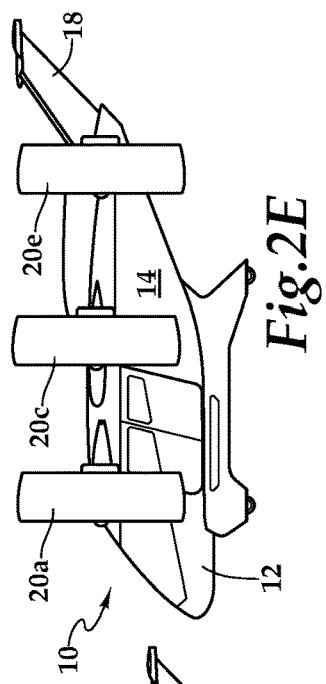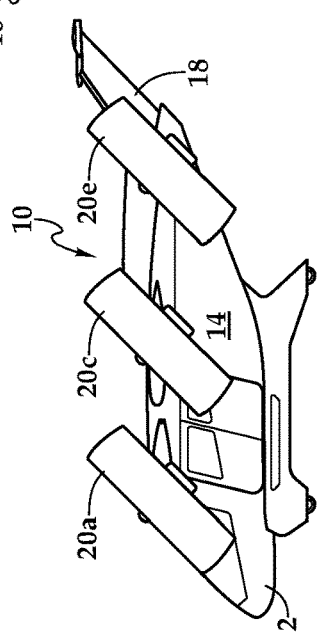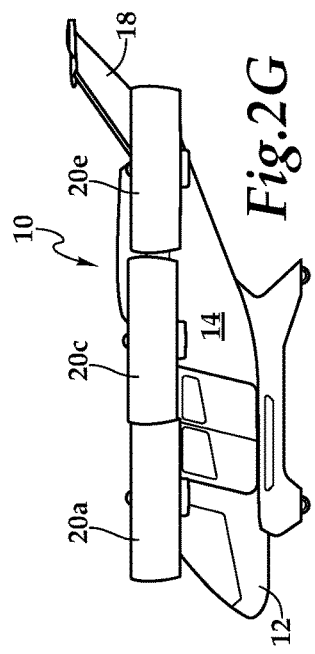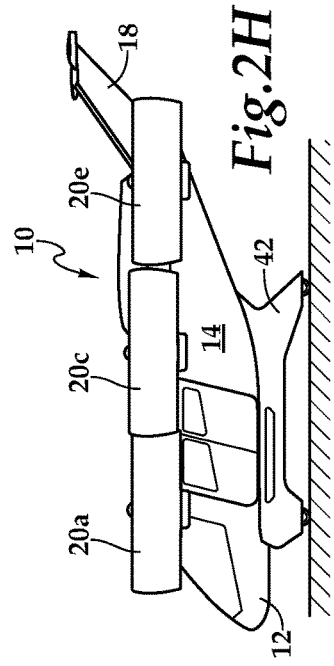

AIRCRAFT AIRFRAMES HAVING INTEGRAL FUEL TANKS

TECHNICAL FIELD OF THE DISCLOSURE

The present disclosure relates, in general, to fuel systems operable for use on aircraft configured for electric flight and, in particular, to aircraft airframes having integral fuel tanks that provide structural support for flight loads and fuel containment of pressurized fuel for aircraft configured for electric flight.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another example of VTOL aircraft, attempt to overcome these drawbacks by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric vertical takeoff and landing (eVTOL) aircraft as well as electric fixed-wing aircraft utilize electricity to power the various systems of the aircraft including the propulsion systems. For example, a battery system may be used to power one or more rotor assemblies of a helicopter or a fixed-wing aircraft, two or more rotor assemblies of a tiltrotor or a tiltwing aircraft, four rotor assemblies of a quadcopter aircraft or any number of rotor assemblies of a multicopter aircraft. It has been found, however, that due to limitations in the energy density of battery cells, when batteries are used as the fuel system for aircraft propulsion, the aircraft may have limited range and/or limited payload capacity. Accordingly, a need has arisen for improved fuel systems that provides energy for aircraft propulsion that minimize the weight penalty associated with energy storage in battery systems.

SUMMARY

In a first aspect, the present disclosure is directed to a fuselage airframe subject to flight loads. The fuselage airframe includes at least two fore/aft floor beams having a plurality of floor intercostals laterally extending therebetween and at least two fore/aft roof beams having a plurality of roof intercostals laterally extending therebetween. A plurality of cabin frames extends generally vertically between respective floor and roof beams. At least one fuel tank configured to contain a pressurized fuel integrally forms at least a portion of one of the beams, the intercostals or the frames such that the at least one fuel tank is subject to the flight loads.

In some embodiments, the at least one fuel tank may be a plurality of fuel tanks each forming at least a portion of one of the beams, the intercostals or the frames such that each of the fuel tanks is subject to the flight loads. In certain embodiments, the at least one fuel tank may be a hydrogen fuel tank, a cylindrical fuel tank and/or a carbon fiber fuel tank such as a carbon fiber fuel tank having an aluminum liner. In some embodiments, the at least one fuel tank may extend in the fore/aft direction of the fuselage airframe, the lateral direction of the fuselage airframe or the vertical direction of the fuselage airframe. In certain embodiments, the at least one fuel tank may extend between two floor beams, between two roof beams, between one of the floor beams and one of the roof beams, between two floor intercostals or between two roof intercostals.

In a second aspect, the present disclosure is directed to a wing airframe subject to flight loads. The wing airframe includes forward and aft wing spars with a plurality of wing ribs extending therebetween. At least one fuel tank configured to contain a pressurized fuel integrally forms at least a portion of one of the spars or the ribs such that the at least one fuel tank is subject to the flight loads. In some embodiments, the at least one fuel tank may extend between the forward and aft wing spars or between two wing ribs.

In a third aspect, the present disclosure is directed to an aircraft having a fuselage airframe subject to flight loads. The fuselage airframe includes at least two fore/aft floor beams having a plurality of floor intercostals laterally extending therebetween and at least two fore/aft roof beams having a plurality of roof intercostals laterally extending therebetween. A plurality of cabin frames extends generally vertically between respective floor and roof beams. At least one fuel tank configured to contain a pressurized fuel integrally forms at least a portion of one of the beams, the intercostals or the frames such that the at least one fuel tank is subject to the flight loads. The aircraft may also have a wing airframe that is coupled to the fuselage airframe. The wing airframe includes forward and aft wing spars with a plurality of wing ribs extending therebetween. At least one fuel tank configured to contain a pressurized fuel integrally forms at least a portion of one of the spars or the ribs such that the at least one fuel tank is subject to the flight loads. In some embodiments, the at least one fuel tank may extend between the forward and aft wing spars or between two wing ribs.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2H are schematic illustrations of an eVTOL aircraft having an airframe with integral fuel tanks in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
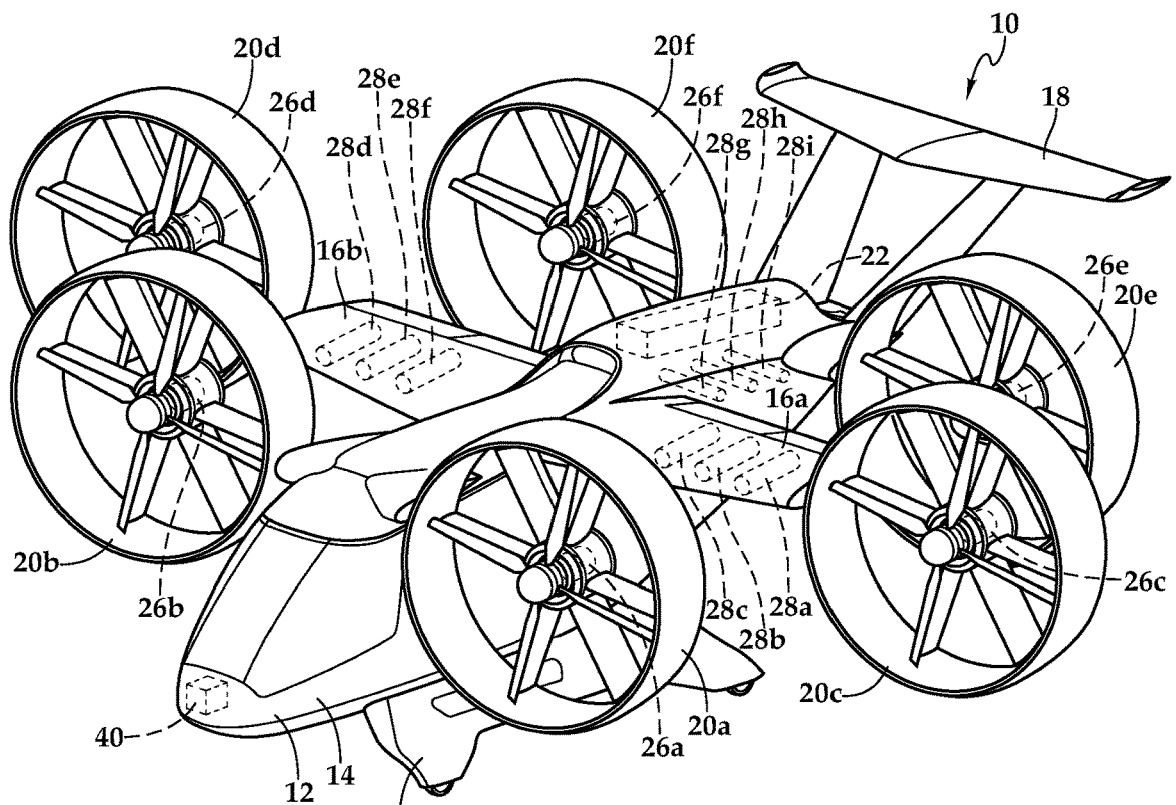
FIGS. 1A-1F are schematic illustrations of an eVTOL aircraft having an airframe with integral fuel tanks in accordance with embodiments of the present disclosure.
Figure 1A:
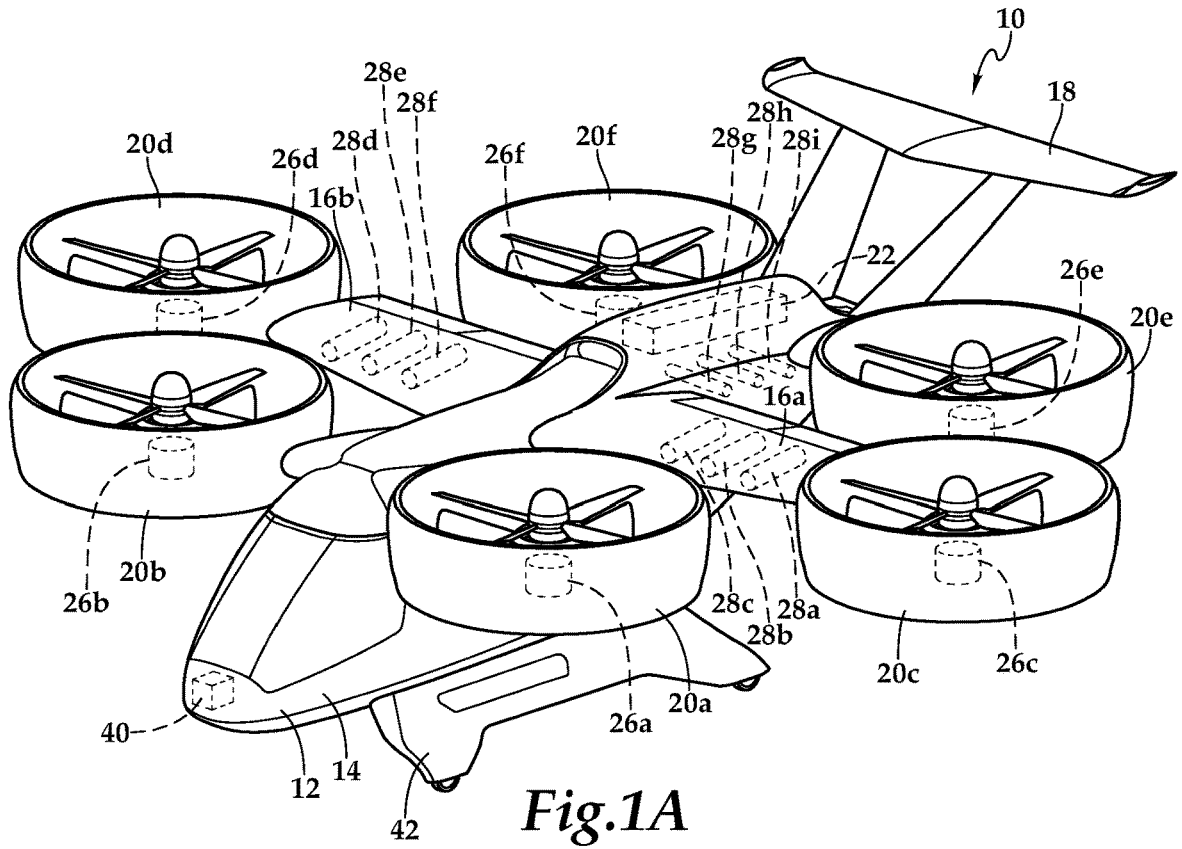
Figure 1D:
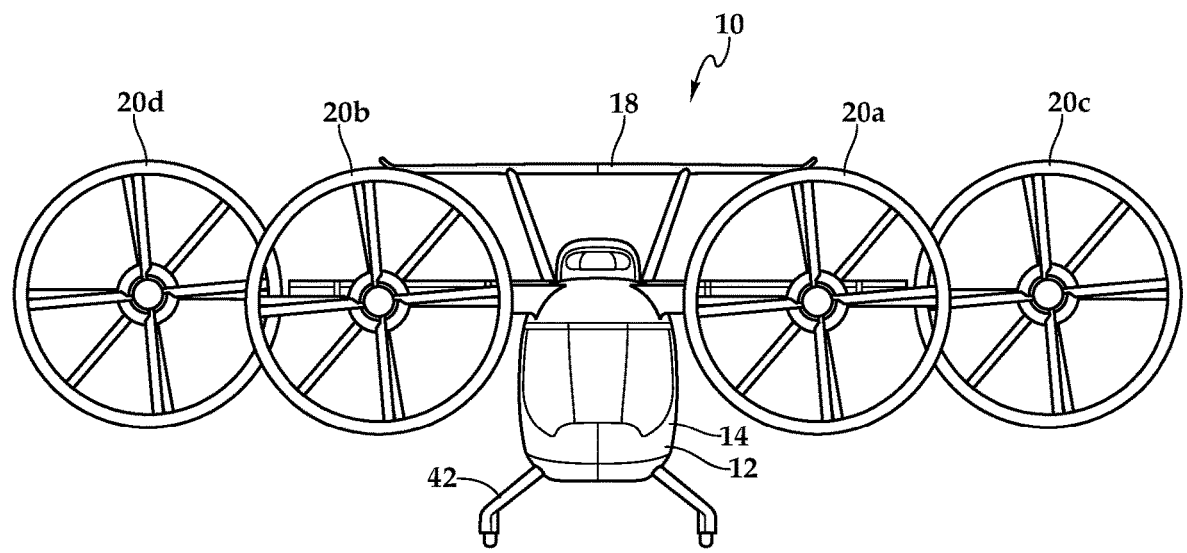
Figure 1C:
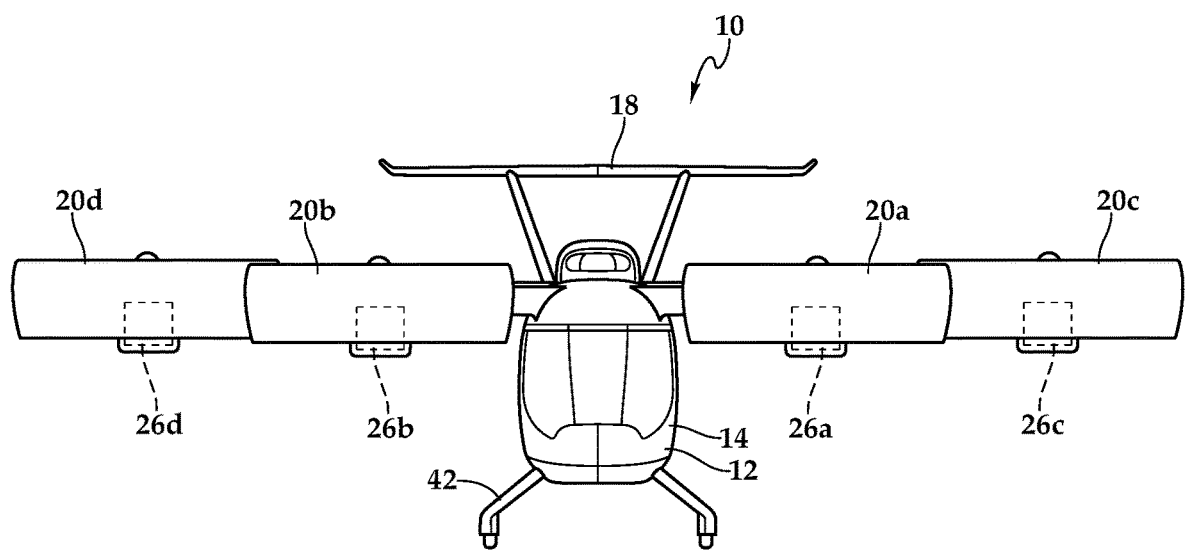
Figure 1F:
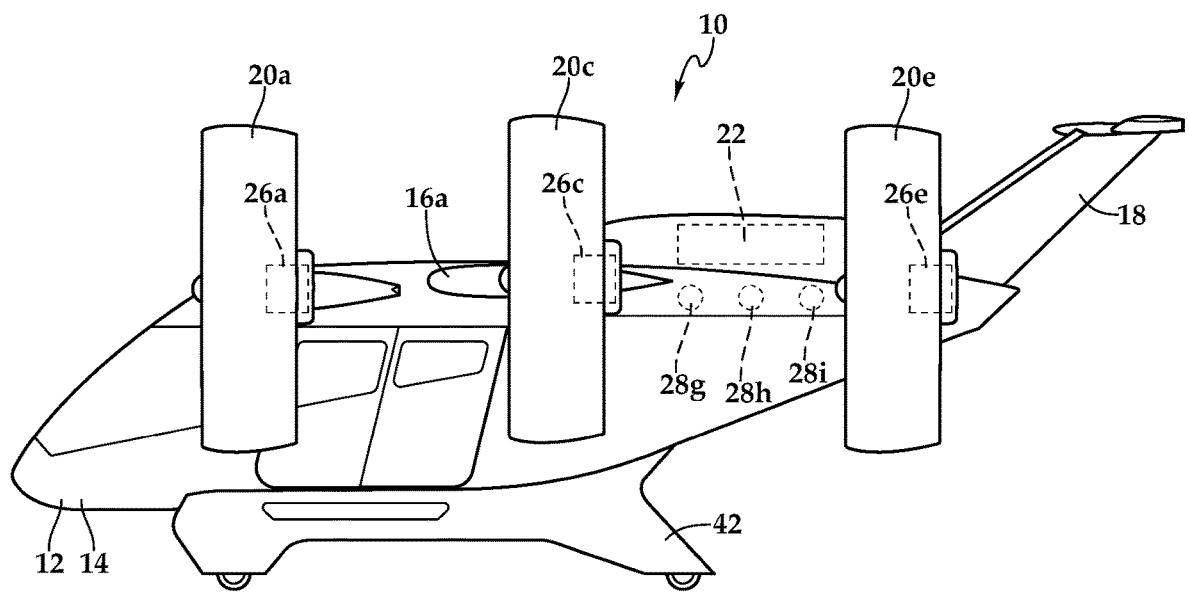
Figure 1E:
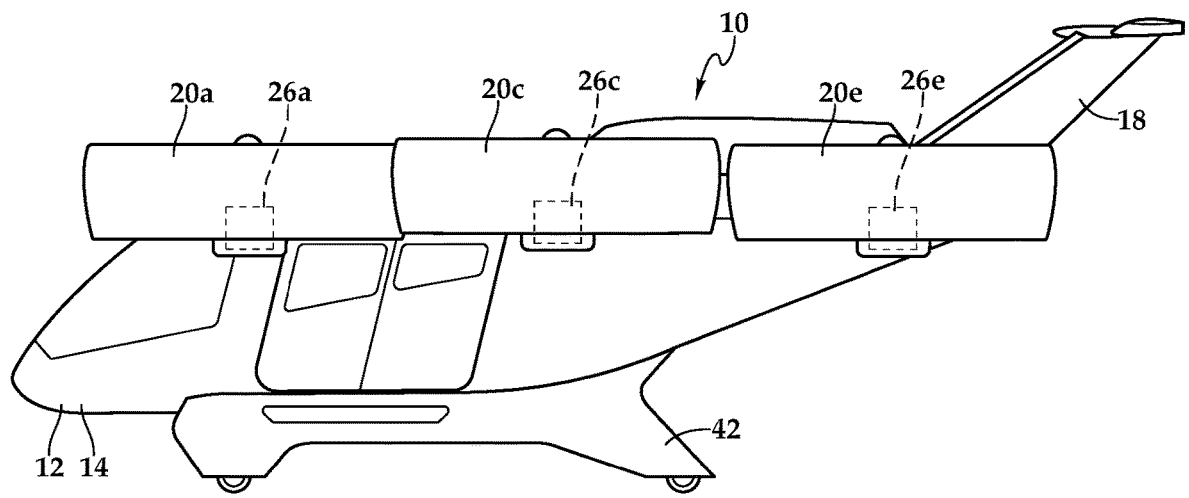

Referring to FIGS. 1A-1F in the drawings, a rotorcraft depicted as an electric vertical takeoff and landing (eVTOL) aircraft having an airframe with integral fuel tanks is schematically illustrated and generally designated 10. As illustrated, aircraft 10 is an air taxi that may be pilot operated, remotely operated or may operate autonomously to provide air taxi services. FIGS. 1A, 1C, 1E depict aircraft 10 in a VTOL orientation wherein the rotor systems provide thrust-borne lift. FIGS. 1B, 1D, 1F depict aircraft 10 in a forward flight orientation wherein the rotor systems provide forward thrust with the forward airspeed of aircraft 10 providing wing-borne lift enabling aircraft 10 to have a high speed and/or high endurance forward flight mode. In the illustrated embodiment, aircraft 10 has an airframe 12 including a fuselage 14, wings 16a, 16b and a tail assembly 18. Each of wings 16a, 16b has an airfoil cross-section that generates lift responsive to the forward airspeed of aircraft 10. In the illustrated embodiment, wings 16a, 16b are straight wings with a tapered leading edge. It will be appreciated, however, that wings 16a, 16b may have of a wide variety of shapes, sizes and configurations, depending upon the performance characteristics desired. In the illustrated embodiment, wings 16a, 16b include ailerons to aid in roll and/or pitch control of aircraft 10 during forward flight. Tail assembly 18 is depicted as having a pair of vertical stabilizers that may include one or more rudders to aid in yaw control of aircraft 10 during forward flight. In addition, tail assembly 18 has a horizontal stabilizer that may include one or more elevators to aid in pitch control of aircraft 10 during forward flight. It will be appreciated, however, that tail assembly 18 may have of a wide variety of shapes, sizes and configurations, depending upon the performance characteristics desired.

In the illustrated embodiment, aircraft 10 includes a thrust array depicted as six rotor systems. In other embodiments, an aircraft having an airframe with integral fuel tanks of the present disclosure could have other numbers of rotor systems both greater than or less than six. For example, a helicopter having an airframe with integral fuel tanks of the present disclosure could have one or more rotor systems, a tiltrotor or tiltwing aircraft having an airframe with integral fuel tanks of the present disclosure could have two or more proprotor systems, a quadcopter aircraft having an airframe with integral fuel tanks of the present disclosure could have four rotor systems and a multicopter aircraft having an airframe with integral fuel tanks of the present disclosure could have any number of rotor systems. In the illustrated embodiment, the thrust array of aircraft 10 includes a forward-port rotor system 20a, a forward-starboard rotor system 20b, a mid-port rotor system 20c, a mid-starboard rotor system 20d, an aft-port rotor system 20e and an aft-starboard rotor system 20f, which may collectively be referred to as rotor systems 20. Forward-port rotor system 20a and forward-starboard rotor system 20b are each rotatably mounted to a shoulder portion of fuselage 14 at a forward station thereof. Mid-port rotor system 20c is rotatably mounted on the outboard end of wing 16a. Mid-starboard rotor system 20d is rotatably mounted on the outboard end of wing 16b. Aft-port rotor system 20e and aft-starboard rotor system 20f are each rotatably mounted to a shoulder portion of fuselage 14 at an aft station thereof.

In the illustrated embodiment, rotor systems 20 are ducted rotor systems each having a four bladed rotor assembly with variable pitch rotor blades operable for collective pitch control. In other embodiments, the rotor systems could be non-ducted or open rotor systems, the number of rotor blades could be either greater than or less than four and/or the rotor blades could have a fixed pitch. Rotor system 20a includes at least one variable speed electric motor 26a, rotor system 20b includes at least one variable speed electric motor 26b, rotor system 20c includes at least one variable speed electric motor 26c, rotor system 20d includes at least one variable speed electric motor 26d, rotor system 20e includes at least one variable speed electric motor 26e and rotor system 20f includes at least one variable speed electric motor 26f. The electric motors 26a-26f associated with rotor systems 20 may collectively be referred to as electric motors 26. Each of electric motors 26 may have a speed controller or other modulating device operably associated therewith that is configured to provide variable speed control over a wide range of rotor speeds.

When aircraft 10 is operating in the VTOL orientation and supported by thrust-borne lift, rotor systems 20 each have a generally horizontal orientation such that the rotor assemblies are rotating in generally in the same horizontal plane, as best seen in FIGS. 1C, 1E. When aircraft 10 is operating in the forward flight orientation and supported by wing-borne lift, rotor systems 20 each have a generally vertical orientation with the forward rotor assemblies rotating generally in a forward-vertical plane, the mid rotor assemblies rotating generally in a mid-vertical plane and the aft rotor assemblies rotating generally in an aft-vertical plane, as best seen in FIG. 1F. Transitions between the VTOL orientation and the forward flight orientation of aircraft 10 are achieved by changing the angular positions of rotor systems 20 between their generally horizontal orientations and the generally vertical orientations as discussed herein.

Aircraft 10 includes an electrical system 22 that may include elements for the generation, storage, regulation and distribution of electric power. In the illustrated embodiment, electrical system 22 includes one or more hydrogen fuel cells that are configured to produce electrical energy from an electrochemical reaction between hydrogen and oxygen. Each hydrogen fuel cell includes a cathode configured to receive oxygen from the ambient air, an anode configured to receive hydrogen fuel and an electrolyte between the anode and the cathode that allows positively charged ions to move between the anode and the cathode. Preferably, each hydrogen fuel cell is formed as a fuel cell stack comprising a plurality of fuel cells (cathode, electrolyte and anode) in series to increase the output thereof. The hydrogen fuel cells may be proton-exchange membrane fuel cells or polymer electrolyte membrane fuel cells, for example. The hydrogen fuel cells receive the hydrogen fuel from fuel tanks positioned throughout aircraft 10 that are integral with airframe 12 such that the fuel tanks provide structural support for flight loads and fuel containment capabilities for pressurized fuel. In the illustrated embodiment, fuel tanks 28a, 28b, 28c are integral with the airframe of wing 16a, fuel tanks 28d, 28e, 28f are integral with the airframe of wing 16b and fuel tanks 28g, 28h, 28i are integral with the airframe of fuselage 14. Fuel tanks 28a-28f as well as other fuel tanks integral with airframe 12 may collectively or generically be referred to herein as fuel tanks 28. Fuel tanks 28 may be cylindrical fuel tanks formed from high strength and lightweight materials such as carbon fiber or carbon fiber having an aluminum liner. Fuel tanks 28 are configured to contain a pressurized fuel such as compressed gaseous hydrogen fuel or liquified hydrogen fuel, in which case, fuel tanks 28 are thermally insulated. It should be noted that the use of hydrogen fuel cells may extend the range of an electrically powered aircraft by three to five times or more compared to a battery powered aircraft depending upon the number of fuel tanks 28 that are utilized.

In addition to the hydrogen fuel cells, in some embodiments, electrical system 22 may include one or more battery systems that store chemical energy and convert the chemical energy to electrical energy. For example, electrical system 22 may include an array of high-power batteries that may be used to boost the supply of propulsive electric power to electric motors 26 during high power demand maneuvers such as takeoff, hover, landing, certain mid-flight operations, emergency operations and the like, which may be referred to as the takeoff and landing power mode of aircraft 10. In this configuration, the hydrogen fuel cells could be used to provide all of the required electrical power during the cruise phase or forward flight portion of a mission, which may be referred to as the cruise power mode of aircraft 10, including providing electric power to recharge the high-power batteries such that the high-power batteries are recharged for subsequent takeoff and landing power mode operations.

Aircraft 10 has a fly-by-wire control system that includes a flight control system 40 that is preferably a redundant digital flight control system including multiple independent flight control computers. Flight control system 40 preferably includes non-transitory computer readable storage media including a set of computer instructions executable by one or more processors for controlling the operation of aircraft 10. Flight control system 40 may be implemented on one or more general-purpose computers, special purpose computers or other machines with memory and processing capability. Flight control system 40 may include one or more memory storage modules including random access memory, non-volatile memory, removable memory or other suitable memory entity. Flight control system 40 may be a microprocessor-based system operable to execute program code in the form of machine-executable instructions. Flight control system 40 may be connected to other computer systems via a suitable communication network that may include both wired and wireless connections.

Flight control system 40 communicates via a wired communications network within airframe 12 with electrical system 22 and the electronics nodes of each rotor system 20. Flight control system 40 receives sensor data from and sends flight command information to rotor systems 20 such that each rotor system 20 may be individually and independently controlled and operated. For example, flight control system 40 is operable to individually and independently control the rotor speed and the collective pitch of each rotor system 20 as well as the angular position of each rotor system 20. Flight control system 40 may autonomously control some or all aspects of flight operation for aircraft 10. Flight control system 40 is also operable to communicate with remote systems, such as a ground station via a wireless communications protocol. The remote system may be operable to receive flight data from and provide commands to flight control system 40 to enable remote flight control over some or all aspects of flight operation for aircraft 10. In addition, aircraft 10 may be pilot operated such that a pilot interacts with a pilot interface that receives flight data from and provide commands to flight control system 40 to enable onboard pilot control over some or all aspects of flight operation for aircraft 10.

Aircraft 10 includes a landing gear 42 for ground operations. Landing gear 42 may include passively operated pneumatic landing struts or actively operated landing struts. In the illustrated embodiment, landing gear 42 includes a plurality of wheels that enable aircraft 10 to perform ground maneuvers. Landing gear 42 may include a passive brake system, an active brake system such as an electromechanical braking system and/or a manual brake system to facilitate parking as required during ground operations and/or passenger ingress and egress.

Referring additionally to FIGS. 2A-2H in the drawings, a sequential flight-operating scenario of aircraft 10 is depicted. As best seen in FIG. 2A, aircraft 10 is positioned on a surface prior to takeoff. When aircraft 10 is ready for a mission, flight control system 40 commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne lift and thrust-borne lift. In addition, flight control system 40 provides command and control over electrical system 22 including regulating the operation of the fuel cells including the flow of hydrogen fuel thereto and regulating the operation of the battery system such that electrical energy is suitably provided to all power consumers of aircraft 10 during ground operations and all flight regimes.

As best seen in FIG. 2B, aircraft 10 has performed a vertical takeoff and is engaged in thrust-borne lift. As illustrated, the rotor assemblies of each rotor system 20 are rotating in the same horizontal plane forming a two-dimensional distributed thrust array of six rotor systems. As the longitudinal axis and the lateral axis of aircraft 10 are both in the horizontal plane, aircraft 10 has a level flight attitude. During hover, flight control system 40 may utilize the individual variable speed control capability of rotor systems 20 to control flight dynamics to maintain hover stability and to provide pitch, roll and yaw authority for aircraft 10. After vertical assent to the desired elevation, aircraft 10 may begin the transition from thrust-borne lift to wing-borne lift. As best seen from the progression of FIGS. 2B-2D, the angular positions of rotor systems 20 are changed by a pitch down rotation to transition aircraft 10 from the VTOL orientation toward the forward flight orientation. As seen in FIG. 2C, rotor systems 20 have been collectively inclined about forty-five degrees pitch down. In the conversion orientations of aircraft 10, a portion of the thrust generated by rotor systems 20 provides lift while a portion of the thrust generated by rotor systems 20 urges aircraft 10 to accelerate in the forward direction such that the forward airspeed of aircraft 10 increases allowing wings 16*a*, 16*b* to offload a portion and eventually all of the lift requirement from rotor systems 20. As best seen in FIG. 2D, rotor systems 20 have been collectively inclined about ninety degrees pitch down such that the rotor assemblies are rotating in vertical planes providing forward thrust for aircraft 10 with wings 16*a*, 16*b* providing lift. Even though the conversion from the VTOL orientation to the forward flight orientation of aircraft 10 has been described as progressing with collective pitch down rotation of rotor systems 20, in other implementations, all rotor systems 20 need not be operated at the same time or at the same rate.

As forward flight with wing-borne lift requires significantly less thrust than VTOL flight with thrust-borne lift, the operating speed of some or all of rotor systems 20 may be reduced particularly in embodiments having collective pitch control. In certain embodiments, some of rotor systems 20 of aircraft 10 could be shut down during forward flight. As aircraft 10 approaches its destination, aircraft 10 may begin its transition from wing-borne lift to thrust-borne lift. As best seen from the progression of FIGS. 2E-2G, the angular positions of rotor systems 20 are changed by a pitch up rotation to transition aircraft 10 from the forward flight orientation toward the VTOL orientation. As seen in FIG. 2F, rotor systems 20 have been collectively inclined about forty-five degrees pitch up. In the conversion orientations of aircraft 10, a portion of the thrust generated by rotor systems 20 begins to provide lift for aircraft 10 as the forward airspeed decreases and the lift producing capability of wings 16*a*, 16*b* decreases. As best seen in FIG. 2G, rotor systems 20 have been collectively inclined about ninety degrees pitch up such that the rotor assemblies are rotating in the horizontal plane providing thrust-borne lift for aircraft 10. Even though the conversion from the forward flight orientation to the VTOL orientation of aircraft 10 has been described as progressing with collective pitch up rotation of rotor systems 20, in other implementations, all rotor systems 20 need not be operated at the same time or at the same rate. Once aircraft 10 has completed the transition to the VTOL orientation, aircraft 10 may commence its vertical descent to a surface. As best seen in FIG. 2H, aircraft 10 has landing at the destination location.

Figure 3:
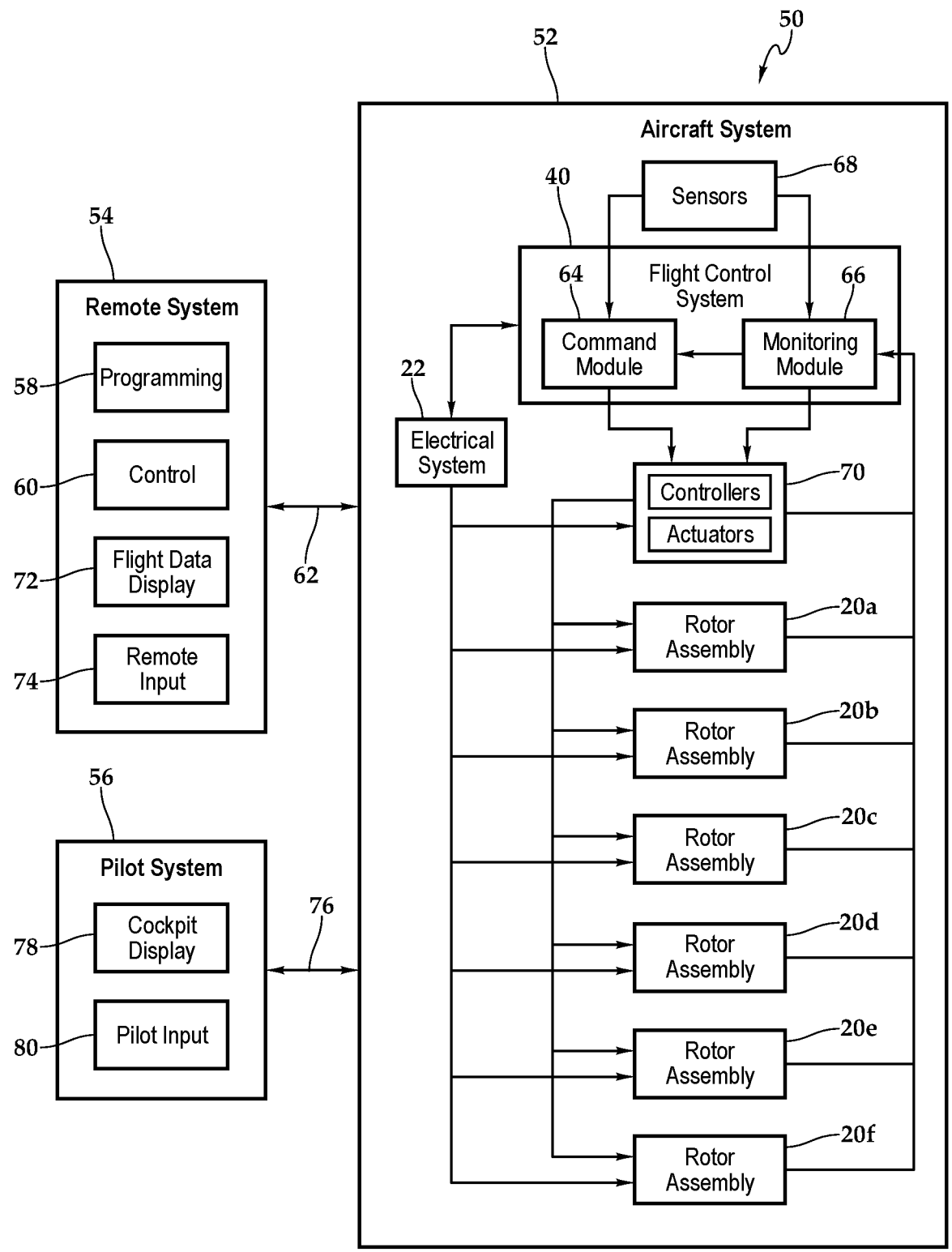
FIG. 3 is a block diagram of control systems for an eVTOL aircraft having an airframe with integral fuel tanks in accordance with embodiments of the present disclosure.

Referring additionally to FIG. 3 in the drawings, a block diagram depicts a control system 50 operable for use with aircraft 10 of the present disclosure. In the illustrated embodiment, system 50 includes three primary computer based subsystems; namely, an aircraft system 52, a remote system 54 and a pilot system 56. In some implementations, remote system 54 includes a programming application 58 and a remote control application 60. Programming application 58 enables a user to provide a flight plan and mission information to aircraft 10 such that flight control system 40 may engage in autonomous control over aircraft 10. For example, programming application 58 may communicate with flight control system 40 over a wired or wireless communication channel 62 to provide a flight plan including, for example, a starting point, a trail of waypoints and an ending point such that flight control system 40 may use waypoint navigation during the mission.

In the illustrated embodiment, flight control system 40 is a computer based system that includes a command module 64 and a monitoring module 66. It is to be understood by those having ordinary skill in the art that these and other modules executed by flight control system 40 may be implemented in a variety of forms including hardware, software, firmware, special purpose processors and combinations thereof. Flight control system 40 receives input from a variety of sources including internal sources such as electrical system 22, sensors 68, controllers and actuators 70 and rotor systems 20*a*-20*f* and external sources such as remote system 54 as well as global positioning system satellites or other location positioning systems and the like. During the various operating modes of aircraft 10 including VTOL mode, forward flight mode and transitions therebetween, command module 64 provides commands to controllers and actuators 70. These commands enable independent operation of each rotor system 20*a*-20*f* including rotor speed, collective pitch and angular position. Flight control system 40 receives feedback from controllers and actuators 70 and rotor systems 20*a*-20*f* This feedback is processed by monitoring module 66 that can supply correction data and other information to command module 64 and/or controllers and actuators 70. Sensors 68, such as vibration sensors, location sensors, attitude sensors, speed sensors, environmental sensors, fuel sensors, temperature sensors and the like also provide information to flight control system 40 to further enhance autonomous control and power allocation capabilities.

Some or all of the autonomous control capability of flight control system 40 can be augmented or supplanted by remote flight control from, for example, remote system 54. Remote system 54 may include one or computing systems that may be implemented on general-purpose computers, special purpose computers or other machines with memory and processing capability. Remote system 54 may be a microprocessor-based system operable to execute program code in the form of machine-executable instructions. In addition, remote system 54 may be connected to other computer systems via a proprietary encrypted network, a public encrypted network, the Internet or other suitable communication network that may include both wired and wireless connections. Remote system 54 communicates with flight control system 40 via communication link 62 that may include both wired and wireless connections.

While operating remote control application 60, remote system 54 is configured to display information relating to one or more aircraft of the present disclosure on one or more flight data display devices 72. Remote system 54 may also include audio output and input devices such as a microphone, speakers and/or an audio port allowing an operator to communicate with other operators, a base station and/or a pilot onboard aircraft 10. The display device 72 may also serve as a remote input device 74 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of aircraft 10 can be augmented or supplanted by onboard pilot flight control from a pilot interface system 56 that includes one or more computing systems that communicate with flight control system 40 via one or more wired communication channels 76. Pilot system 56 preferably includes one or more cockpit display devices 78 configured to display information to the pilot. Cockpit display device 78 may be configured in any suitable form including, for example, a display panel, a dashboard display, an augmented reality display or the like. Pilot system 56 may also include audio output and input devices such as a microphone, speakers and/or an audio port allowing an onboard pilot to communicate with, for example, air traffic control. Pilot system 56 also includes a plurality of user interface devices 80 to allow an onboard pilot to provide control commands to aircraft 10 including, for example, a control panel with switches or other inputs, mechanical control devices such as steering devices or sticks as well as other control devices.

Figure 4A:
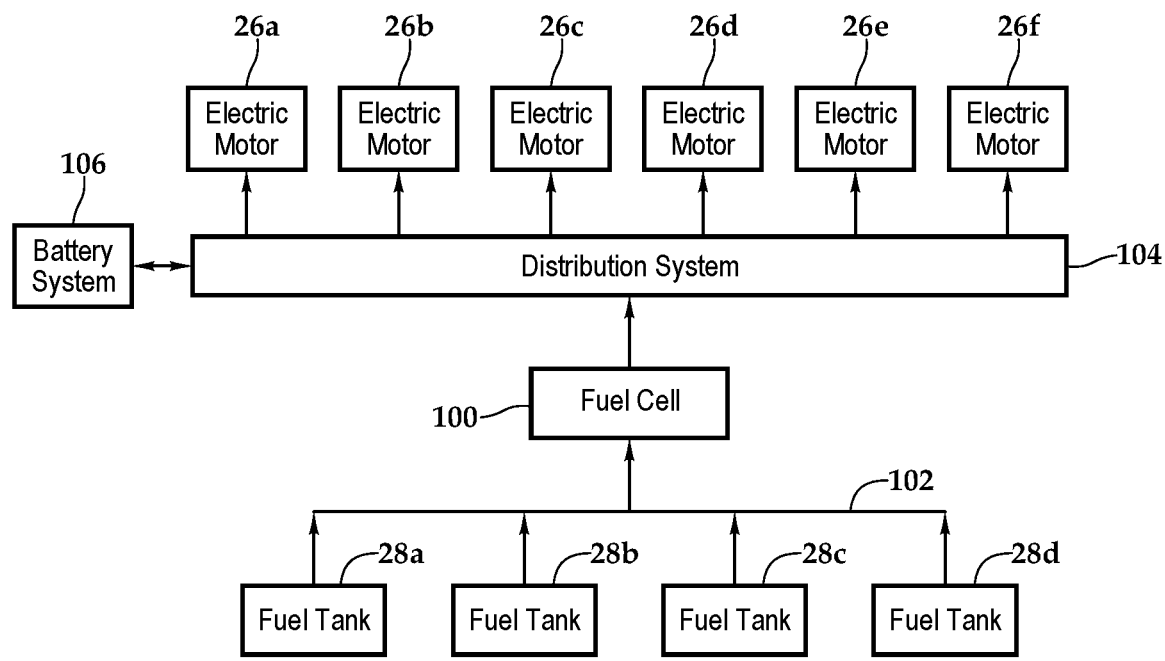
FIGS. 4A-4D are block diagrams of electrical architectures for an eVTOL aircraft having an airframe with integral fuel tanks in accordance with embodiments of the present disclosure.

Referring now to FIGS. 4A-4D of the drawings, various electrical architectures for an eVTOL aircraft having an airframe with integral fuel tanks are depicted. FIG. 4A depicts an embodiment in which aircraft 10 has a single fuel cell 100. As illustrated, hydrogen fuel is delivered to the anodes of fuel cell 100 through a supply line 102 that couples fuel cell 100 to the various fuel tanks denoted as fuel tanks 28*a*, 28*b*, 28*c*, 28*d*. The delivery of hydrogen fuel from the various fuel tanks 28 is preferably regulated by flight control computer 40. In addition, each fuel tank 28 is operably associated with a pressure regulator that is configured to reduce the pressure of the hydrogen fuel in fuel tanks 28 to a desired pressure for supply line 102 and/or a suitable pressure for the anodes of fuel cell 100. Fuel cell 100 provides electric power to a distribution system 104 which may include one or more electrical buses, electrical wiring, inverters and other electrical components known to those having ordinary skill in the art. Distribution system 104 delivers the electric power to the power consumers of aircraft 10 depicted as including electric motors 26*a*-26*f* of rotor systems 20. In addition, distribution system 104 is coupled to battery system 106 that provides for energy storage and serves as an on-demand energy source.

In one example, fuel cell 100 may be sized and designed to provide the required power for all the electrical requirements of aircraft 10 in the cruise power mode based upon the efficiencies of the components and other factors that are well known to those having ordinary skill in the art. Battery system 106 may be sized and designed to provide the required boost in power for the instantaneous peak power requirements in the takeoff and landing power mode based upon the efficiencies of the components and other factors that are well known to those having ordinary skill in the art. In other embodiments, fuel cell 100 or battery system 106 could be sized and designed to meet the total instantaneous peak power requirements for the takeoff and landing power mode. The specific power sharing regime for a particular implementation and/or a particular maneuver will be determined, for example, by a power management module in flight control computer 40 with the power sharing regime ranging between fuel cell 100 exclusively providing power, battery system 106 exclusively providing power or any jointly powered scenario therebetween.

Figure 4B:
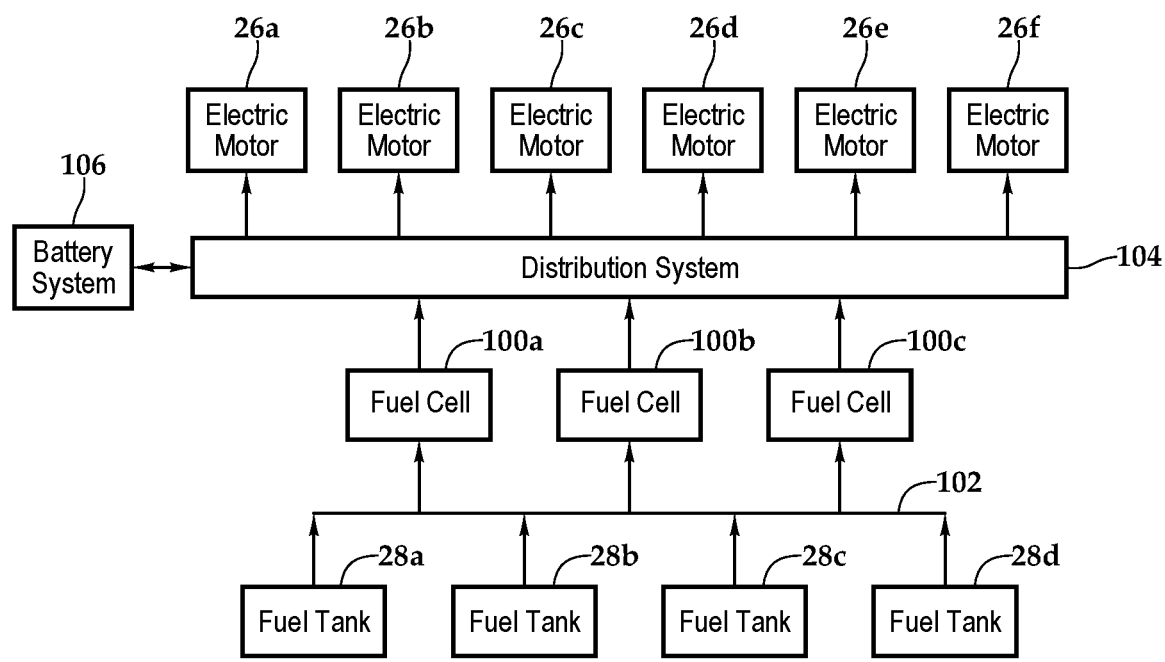

FIG. 4B depicts an embodiment in which aircraft 10 has a plurality of fuel cells; namely, fuel cells 100*a*, 100*b*, 100*c*. As illustrated, hydrogen fuel is delivered to the anodes of fuel cells 100*a*, 100*b*, 100*c* through a common supply line 102 that couples fuel cells 100*a*, 100*b*, 100*c* to the various fuel tanks denoted as fuel tanks 28*a*, 28*b*, 28*c*, 28*d*. The delivery of hydrogen fuel from the various fuel tanks 28 to fuel cells 100*a*, 100*b*, 100*c* is preferably regulated by flight control computer 40. In addition, each fuel tank 28 is operably associated with a pressure regulator that is configured to reduce the pressure of the hydrogen fuel in fuel tanks 28 to a desired pressure for supply line 102 and/or a suitable pressure for the anodes of fuel cells 100*a*, 100*b*, 100*c*. Fuel cells 100*a*, 100*b*, 100*c* provide electric power to a distribution system 104 which may include one or more electrical buses, electrical wiring, inverters and other electrical components known to those having ordinary skill in the art. Distribution system 104 delivers the electric power to the power consumers of aircraft 10 depicted as including electric motors 26*a*-26*f* of rotor systems 20. In addition, distribution system 104 is coupled to battery system 106 that provides for energy storage and serves as an on-demand energy source.

Figure 4C:
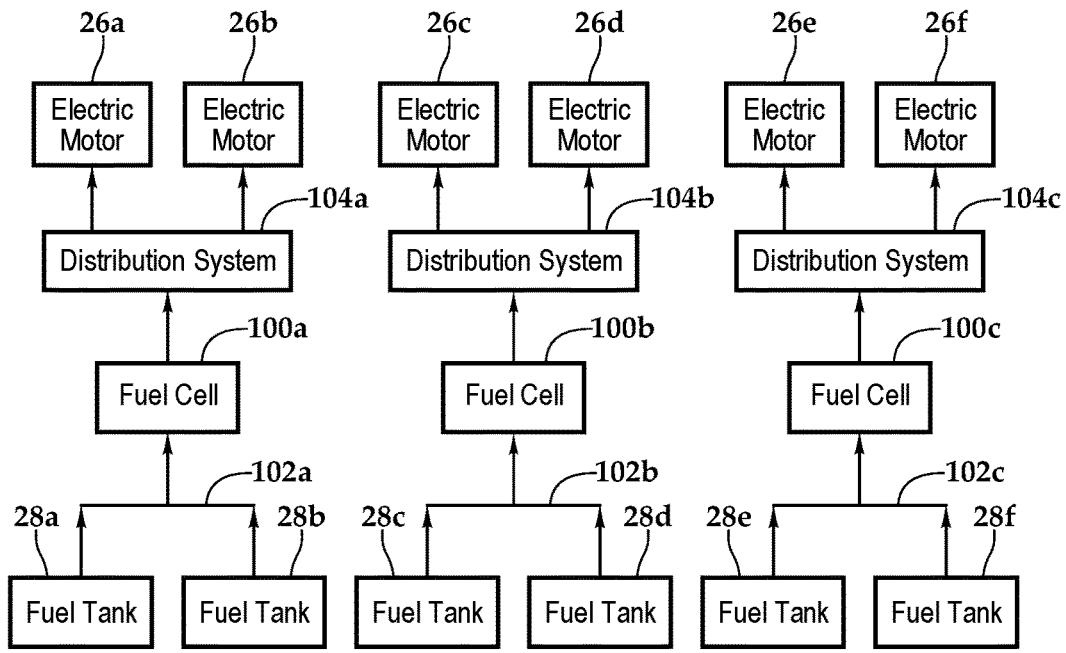

FIG. 4C depicts an embodiment in which aircraft 10 has a plurality of fuel cells; namely, fuel cells 100*a*, 100*b*, 100*c*. As illustrated, hydrogen fuel is delivered to the anodes of fuel cell 100*a* via supply line 102*a* that couples fuel cell 100*a* to fuel tanks 28*a*, 28*b*. The delivery of hydrogen fuel from fuel tanks 28*a*, 28*b* to fuel cell 100*a* is preferably regulated by flight control computer 40 via pressure regulators that are operably associated with fuel tanks 28*a*, 28*b*. Fuel cell 100*a* provides electric power to a distribution system 104*a* that delivers the electric power to specific power consumers of aircraft 10 depicted as including electric motors 26*a*, 26*b*. In addition, distribution system 104*a* may be coupled to a battery system (not shown). Hydrogen fuel is delivered to the anodes of fuel cell 100*b* via supply line 102*b* that couples fuel cell 100*b* to fuel tanks 28*c*, 28*d*. The delivery of hydrogen fuel from fuel tanks 28*c*, 28*d* to fuel cell 100*b* is preferably regulated by flight control computer 40 via pressure regulators that are operably associated with fuel tanks 28*c*, 28*d*. Fuel cell 100*b* provides electric power to a distribution system 104*b* that delivers the electric power to specific power consumers of aircraft 10 depicted as including electric motors 26*c*, 26*d*. In addition, distribution system 104*b* may be coupled to a battery system (not shown). Hydrogen fuel is delivered to the anodes of fuel cell 100*c* via supply line 102*c* that couples fuel cell 100*c* to fuel tanks 28*e*, 28*f*. The delivery of hydrogen fuel from fuel tanks 28*e*, 28*f* to fuel cell 100*c* is preferably regulated by flight control computer 40 via pressure regulators that are operably associated with fuel tanks 28*e*, 28*f*. Fuel cell 100*c* provides electric power to a distribution system 104*c* that delivers the electric power to specific power consumers of aircraft 10 depicted as including electric motors 26*e*, 26*f*. In addition, distribution system 104*c* may be coupled to a battery system (not shown). The electrical architecture of FIG. 4C tends to provide certain redundance to this embodiment of aircraft 10.

Figure 4D:
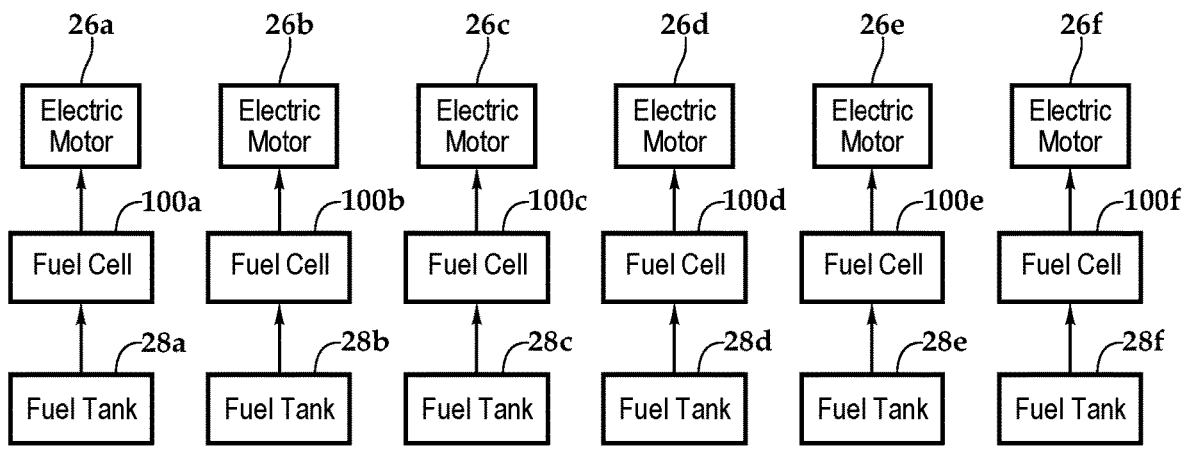

FIG. 4D depicts an embodiment in which aircraft 10 has a plurality of fuel cells; namely, fuel cells 100a, 100b, 100c, 100d, 100e, 100f. As illustrated, each electric motor has a dedicated fuel cell with a dedicated hydrogen fuel source. Specifically, electric motor 26a is powered by fuel cell 100a that receives hydrogen fuel from fuel tank 28a, electric motor 26b is powered by fuel cell 100b that receives hydrogen fuel from fuel tank 28b, electric motor 26c is powered by fuel cell 100c that receives hydrogen fuel from fuel tank 28c, electric motor 26d is powered by fuel cell 100d that receives hydrogen fuel from fuel tank 28d, electric motor 26e is powered by fuel cell 100e that receives hydrogen fuel from fuel tank 28e and electric motor 26f is powered by fuel cell 100f that receives hydrogen fuel from fuel tank 28f. The electrical architecture of FIG. 4D tends to provide certain redundance to this embodiment of aircraft 10.

Figure 5A:
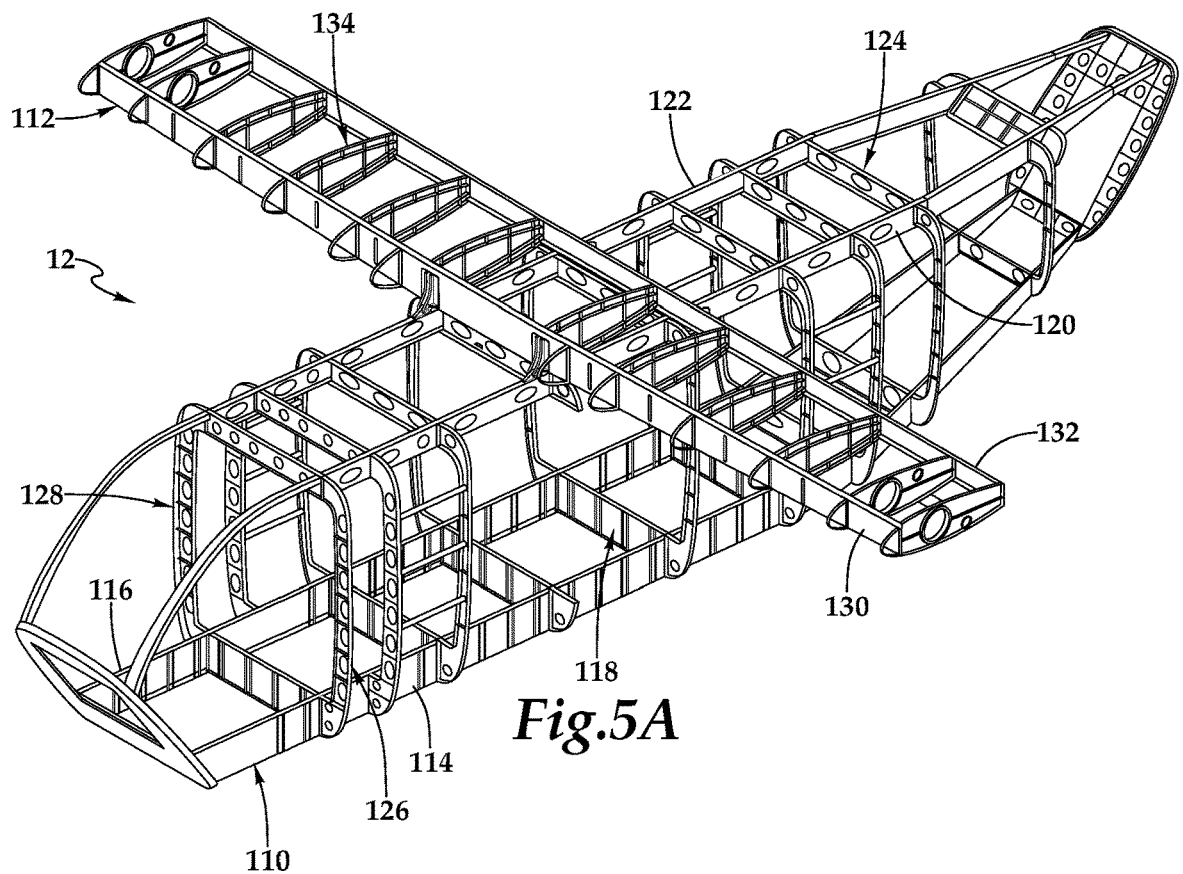
FIGS. 5A-5J are schematic illustrations of airframes with integral fuel tanks for an eVTOL aircraft in accordance with embodiments of the present disclosure.

Referring next to FIGS. 5A-5J of the drawings, various embodiments of a portion of airframe 12 of aircraft 10 including integral fuel tanks will now be discussed. In FIG. 5A, airframe 12 includes a fuselage airframe 110 and wing airframe 112. In the illustrated embodiments, fuselage airframe 110 includes a fore/aft floor beam 114 on the port side of aircraft 10 and a fore/aft floor beam 116 on the starboard side of aircraft 10. Floor beams 114, 116 may each be formed as a single member or may be formed from multiple floor beam sections. Floor beams 114, 116 are preferably formed from high strength and lightweight materials such as carbon fiber, fiberglass, plastic, metal or other suitable material or combination of materials. Fuselage airframe 110 also includes a plurality of floor intercostals laterally extending between floor beams 114, 116, which will individually and collectively be referred to as floor intercostals 118. Floor intercostals 118 may each be formed as a single member and are preferably formed from high strength and lightweight materials such as carbon fiber, fiberglass, plastic, metal or other suitable material or combination of materials.

In the illustrated embodiments, fuselage airframe 110 includes a fore/aft roof beam 120 on the port side of aircraft 10 and a fore/aft roof beam 122 on the starboard side of aircraft 10. Roof beams 120, 122 may each be formed as a single member or may be formed from multiple roof beam sections. Roof beams 120, 122 are preferably formed from high strength and lightweight materials such as carbon fiber, fiberglass, plastic, metal or other suitable material or combination of materials. Fuselage airframe 110 also includes a plurality of roof intercostals laterally extending between roof beams 120, 122, which will individually and collectively be referred to as roof intercostals 124. Roof intercostals 124 may each be formed as a single member and are preferably formed from high strength and lightweight materials such as carbon fiber, fiberglass, plastic, metal or other suitable material or combination of materials. In the illustrated embodiments, fuselage airframe 110 includes a plurality of cabin frames extending generally vertically between respective floor and roof beams. For example, the cabin frames include a plurality of port side cabin frames that extend between floor beam 114 and roof beam 120, which will individually and collectively be referred to as cabin frames 126 and a plurality of starboard side cabin frames that extend between floor beam 116 and roof beam 122, which will individually and collectively be referred to as cabin frames 128. Cabin frames 126, 128 may each be formed as a single member or may be formed from multiple cabin frame sections. Cabin frames 126, 128 are preferably formed from high strength and lightweight materials such as carbon fiber, fiberglass, plastic, metal or other suitable material or combination of materials.

In the illustrated embodiments, wing airframe 112 includes a forward spar 130 and an aft spar 132. Spars 130, 132 may each be formed as a single member or may be formed from multiple spar sections. Spars 130, 132 are preferably formed from high strength and lightweight materials such as carbon fiber, fiberglass, plastic, metal or other suitable material or combination of materials. Wing airframe 112 also includes a plurality of wing ribs extending between forward and aft spars 130, 132, which will individually and collectively be referred to as wing ribs 134. Wing ribs 134 may each be formed as a single member and are preferably formed from high strength and lightweight materials such as carbon fiber, fiberglass, plastic, metal or other suitable material or combination of materials.

In one example, the structural components of airframe 12 such as floor beams 114, 116, floor intercostals 118, roof beams 120, 122, roof intercostals 124, cabin frames 126, 128, wing spars 130, 132 and wings ribs 134 may be formed from composite materials that may include numerous material plies composed of continuous filaments or fibers including one or more of glass, carbon, graphite, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system such as epoxies, polyimides, polyamides, bismaleimides, polyesters, vinyl esters, phenolics, polyetheretherketones (PEEK), polyetherketones (PEK), polyphenylene sulfides (PPS) and the like.

The structural components of airframe 12 may be formed using a layup process wherein a plurality of plies, which may be preimpregnated with an uncured resin, are placed in a mold or other support structure. The plies may have the same or different shapes, may be the same or different materials, may have the same or different fabric weaves, may have the same or different thicknesses, may be continuous or discontinuous, may extend beyond the periphery of the mold or be fully contained within the mold, may be oriented in the same or different directions and/or may have other similarities or differences. In certain embodiments, the plies may be an intermediate modulus epoxy resin impregnated carbon fiber fabric that is stiffer than conventional composite fabrics, thereby allowing for fewer plies, reducing the weight and reducing the manufacturing cost. Each fabric layer is considered a ply of the laminate with the total number of plies ranging from several plies to hundreds of plies or other suitable number of plies. Following layup of the plies, the plies may be compacted and cured to form a laminate then trimmed or otherwise machined as desired. This and/or similar processes may be used to form the various components, subassemblies, assemblies or entire airframe sections.

Figure 5B:
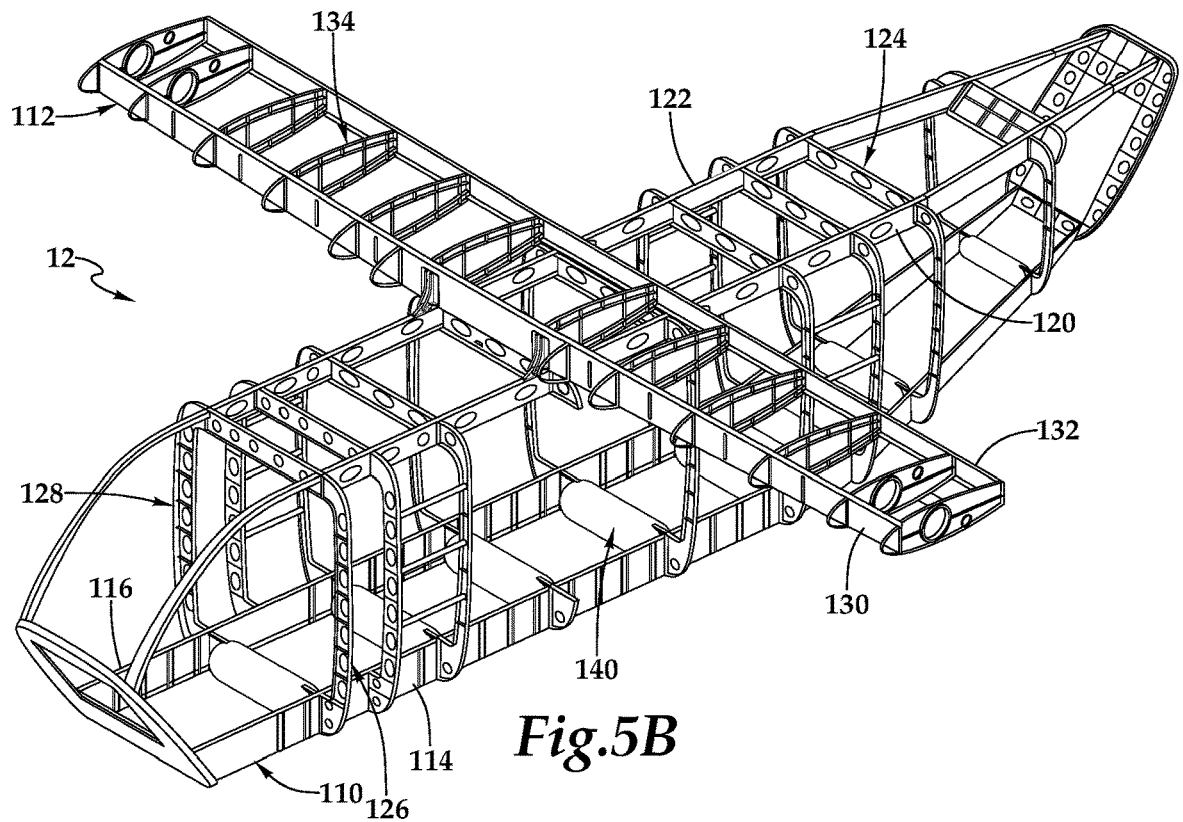

Referring additionally to FIG. 5B, certain structural components of airframe 12 in FIG. 5A have been replaced with fuel tanks configured to contain a pressurized fuel such as pressurized hydrogen fuel. In the illustrated embodiment, the fuel tanks are cylindrical fuel tanks formed from high strength and lightweight materials such as carbon fiber or carbon fiber having an aluminum liner. The fuel tanks may be co-cured together with adjoining structural elements of airframe 12 or may be coupled to the adjoining structural elements of airframe 12 after curing. As illustrated, floor intercostals 118 have been replaced with a plurality of fuel tanks, which will individually and collectively be referred to as floor intercostal fuel tanks 140. Floor intercostal fuel tanks 140 laterally extend between floor beams 114, 116 and form an integral part of fuselage airframe 110 acting as the floor intercostals such that floor intercostal fuel tanks 140 are subject to flight loads in addition to having fuel containment capabilities.

It will be understood by those having ordinary skill in the art that the use of the term "replaced" does not imply that a structural component that was previously a part of the airframe has been removed to allow for a fuel tank of the present disclosure to take its place. Rather, the term "replaced" means that a fuel tank of the present disclosure serves the structural purpose of one or more structural components that would have otherwise performed that structural purpose in the airframe. In the present example, floor intercostal fuel tanks 140 in FIG. 5B serve the structural purpose of floor intercostals 118 of FIG. 5A but there is no implication that floor intercostals 118 were previously positioned between floor beams 114, 116 and removed therefrom prior to floor intercostal fuel tanks 140 being positioned between floor beams 114, 116. As such, the term "replaced" means that fuel tanks of the present disclosure "structurally replace" other structural components of an airframe but do not necessarily "physically replace" previously attached structural components. In this regard, it will be understood by those having ordinary skill in the art that due to structurally difference between, for example, a standard floor intercostals and floor intercostal fuel tanks 140, the number and/or the locations of the fuel tanks of the present disclosure may not be the same as the number and/or the locations of the structural components that are being "replaced" by the fuel tanks of the present disclosure.

Figure 5C:
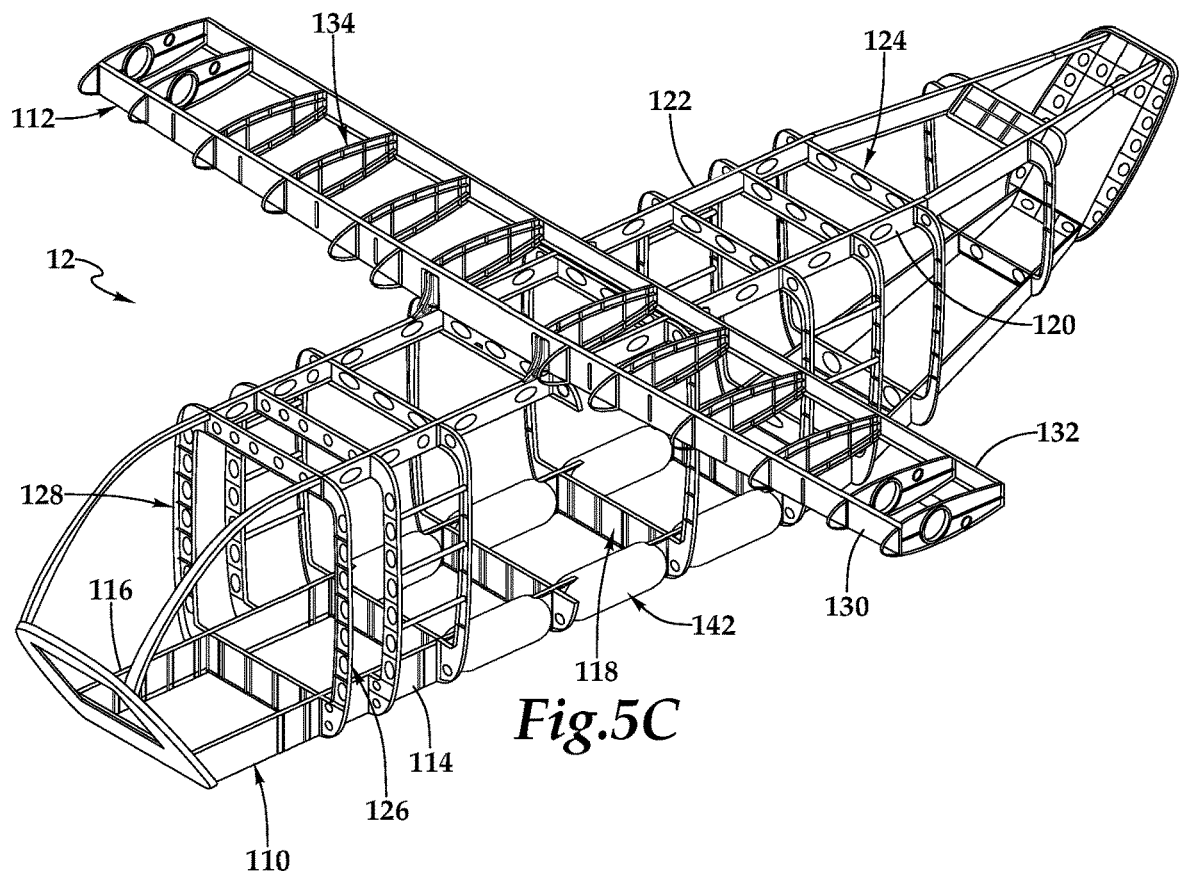

Referring additionally to FIG. 5C, certain structural components of airframe 12 in FIG. 5A have been replaced with fuel tanks of the present disclosure. Specifically, portions of floor beams 114, 116 have been replaced with a plurality of fuel tanks, which will individually and collectively be referred to as floor beam fuel tanks 142. Floor beam fuel tanks 142 extend in the fore/aft direction of airframe 12 between adjacent floor intercostals 118 and form an integral part of fuselage airframe 110 acting as the floor beams such that floor beam fuel tanks 140 are subject to flight loads in addition to having fuel containment capabilities.

Figure 5D:
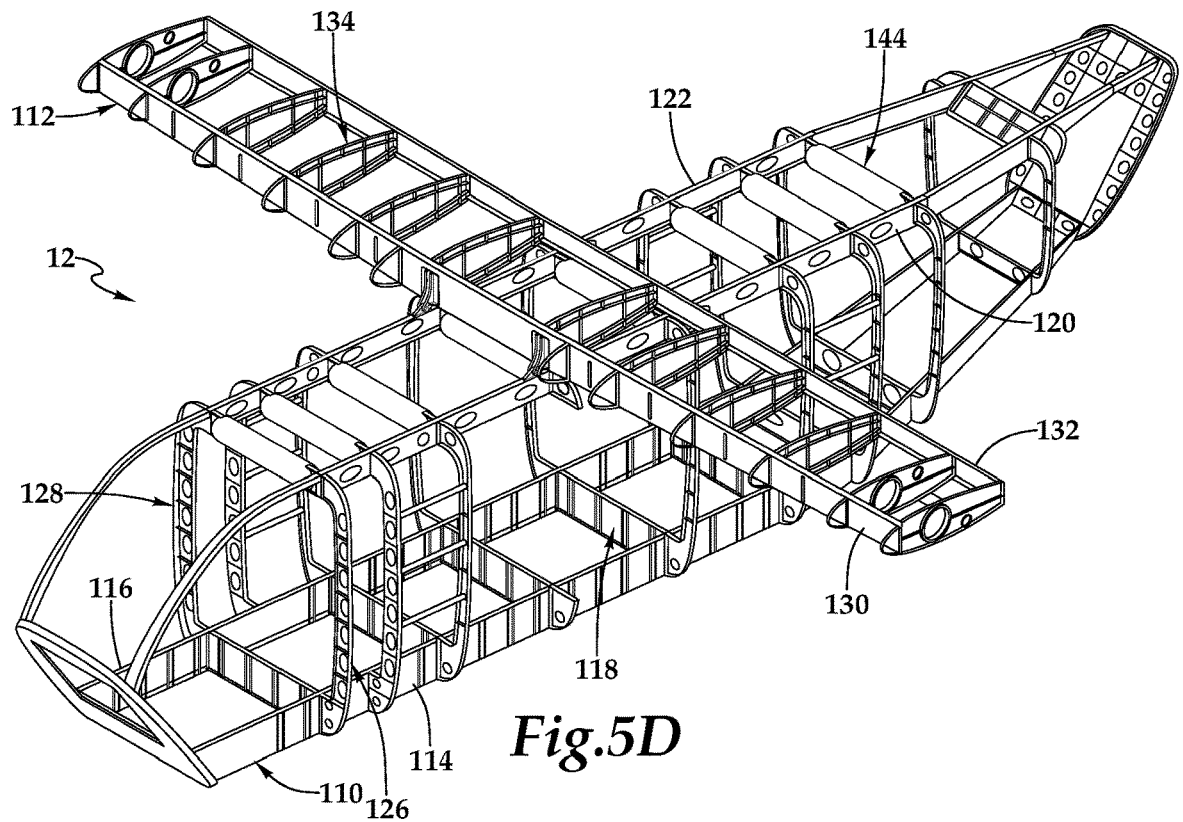

Referring additionally to FIG. 5D, certain structural components of airframe 12 in FIG. 5A have been replaced with fuel tanks of the present disclosure. Specifically, roof intercostals 124 have been replaced with a plurality of fuel tanks, which will individually and collectively be referred to as roof intercostal fuel tanks 144. Roof intercostal fuel tanks 144 laterally extend between roof beams 120, 122 and form an integral part of fuselage airframe 110 acting as the roof intercostals such that roof intercostal fuel tanks 144 are subject to flight loads in addition to having fuel containment capabilities.

Figure 5E:
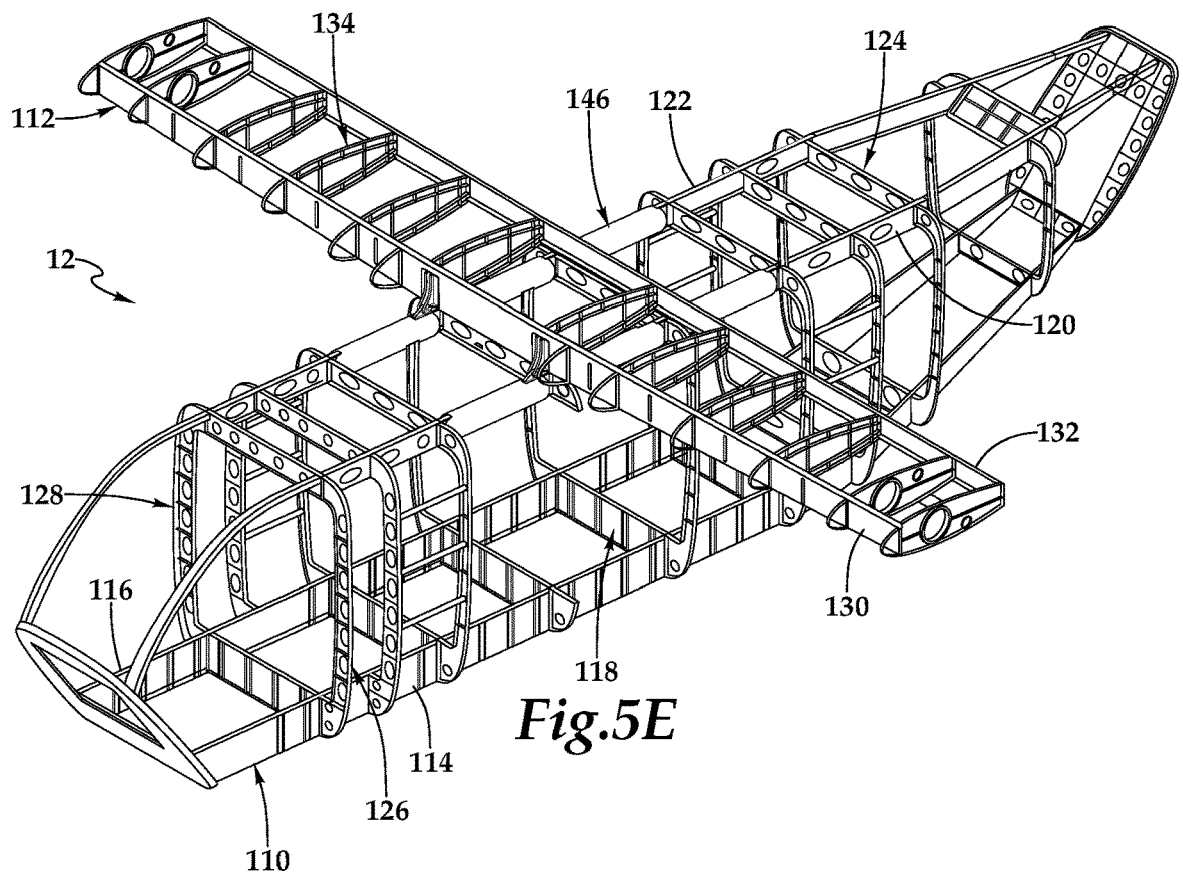

Referring additionally to FIG. 5E, certain structural components of airframe 12 in FIG. 5A have been replaced with fuel tanks of the present disclosure. Specifically, portions of roof beams 120, 122 have been replaced with a plurality of fuel tanks, which will individually and collectively be referred to as roof beam fuel tanks 146. Roof beam fuel tanks 146 extend in the fore/aft direction of airframe 12 between adjacent roof intercostals 124 and form an integral part of fuselage airframe 110 acting as the roof beams such that roof beam fuel tanks 146 are subject to flight loads in addition to having fuel containment capabilities.

Figure 5F:
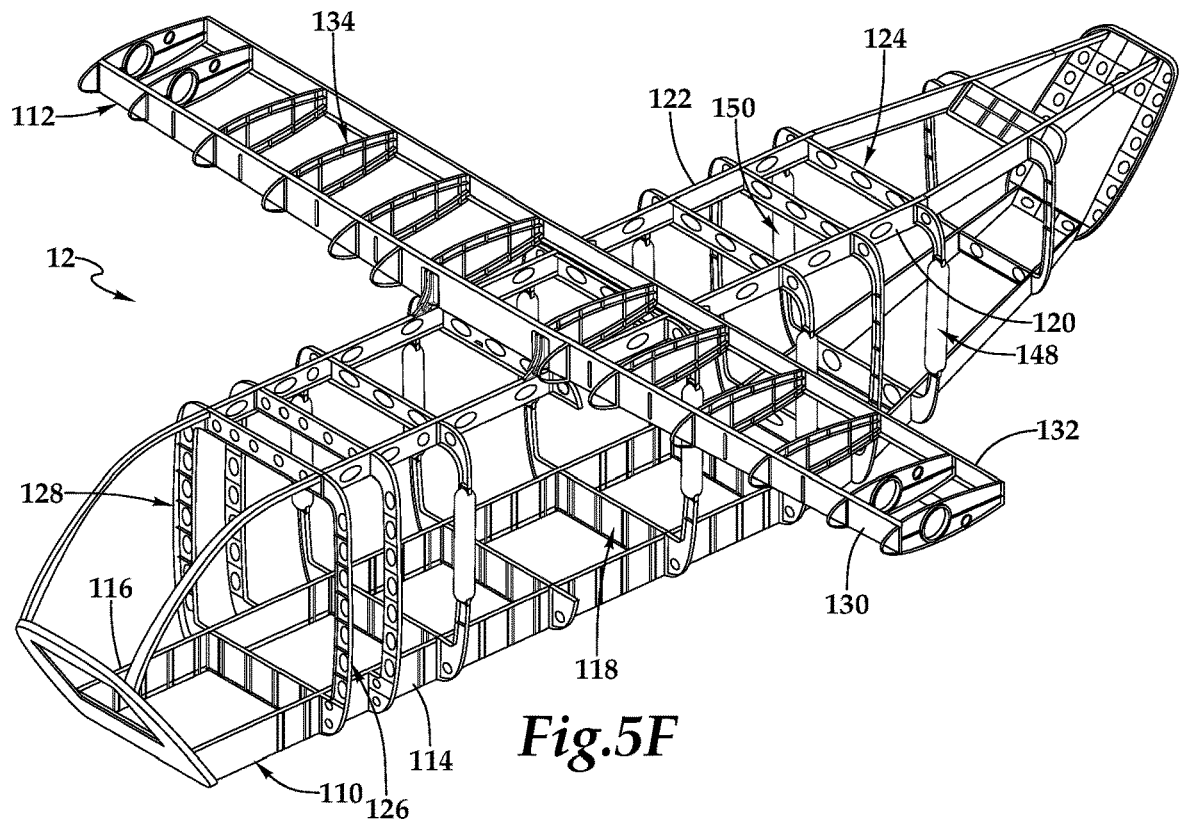

Referring additionally to FIG. 5F, certain structural components of airframe 12 in FIG. 5A have been replaced with fuel tanks of the present disclosure. Specifically, portions of cabin frames 126 have been replaced with a plurality of fuel tanks, which will individually and collectively be referred to as port side cabin frame fuel tanks 148. Cabin frame fuel tanks 148 extend in the vertical direction of airframe 12 between floor beam 114 and roof beam 120 and form an integral part of fuselage airframe 110 acting as the cabin frames such that cabin frame fuel tanks 148 are subject to flight loads in addition to having fuel containment capabilities. Likewise, portions of cabin frames 128 have been replaced with a plurality of fuel tanks, which will individually and collectively be referred to as starboard side cabin frame fuel tanks 150. Cabin frame fuel tanks 150 extend in the vertical direction of airframe 12 between floor beam 116 and roof beam 122 and form an integral part of fuselage airframe 110 acting as the cabin frames such that cabin frame fuel tanks 150 are subject to flight loads in addition to having fuel containment capabilities.

Figure 5G:
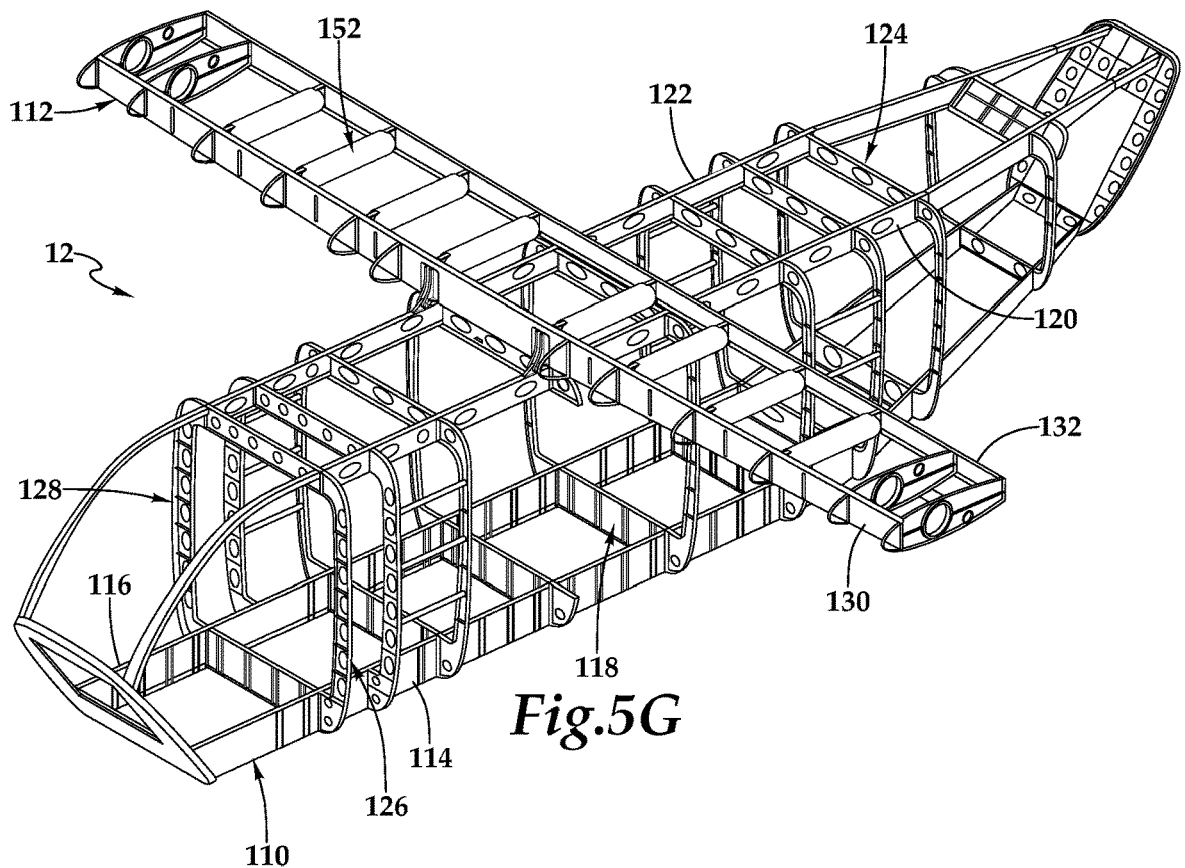

Referring additionally to FIG. 5G, certain structural components of airframe 12 in FIG. 5A have been replaced with fuel tanks of the present disclosure. Specifically, wing ribs 134 have been replaced with a plurality of fuel tanks, which will individually and collectively be referred to as wing rib fuel tanks 152. Wing rib fuel tanks 152 extend between forward and aft wing spars 130, 132 and form an integral part of wing airframe 112 acting as the wing ribs such that wing rib fuel tanks 152 are subject to flight loads in addition to having fuel containment capabilities.

Figure 5H:
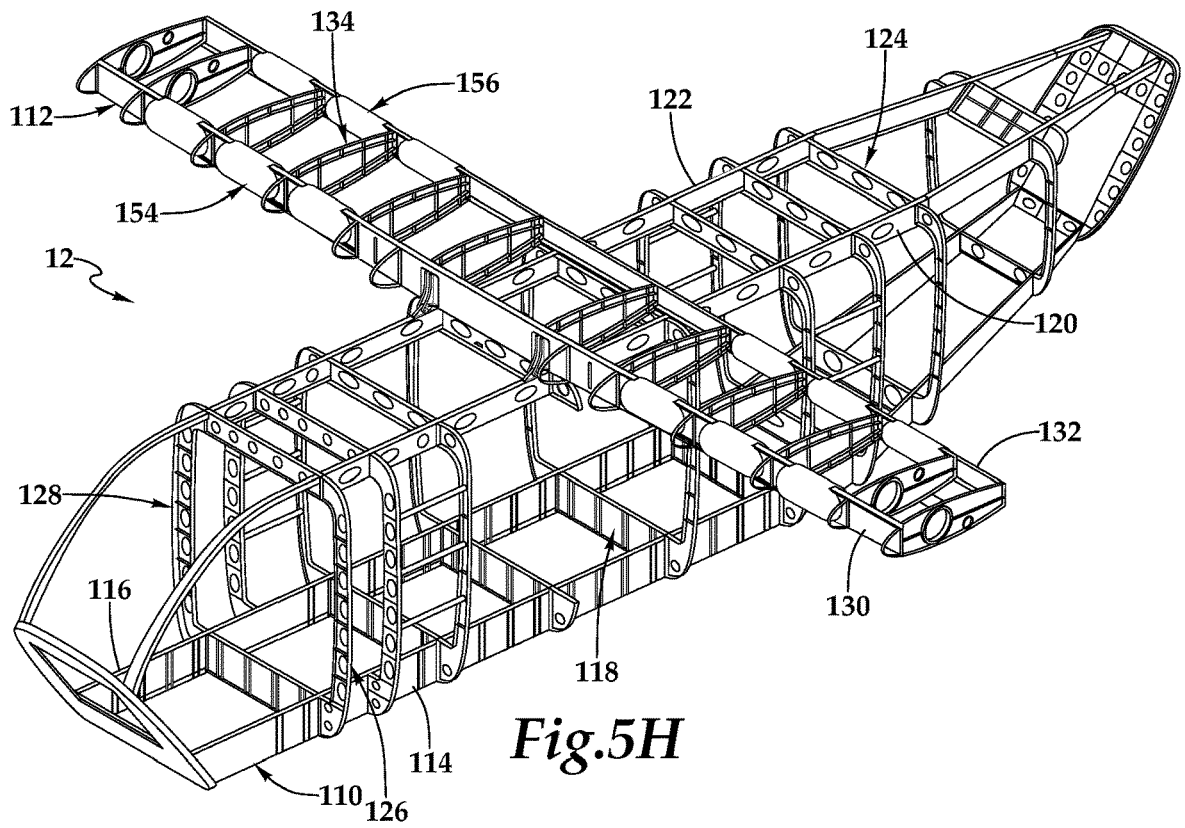
Figure 5I:
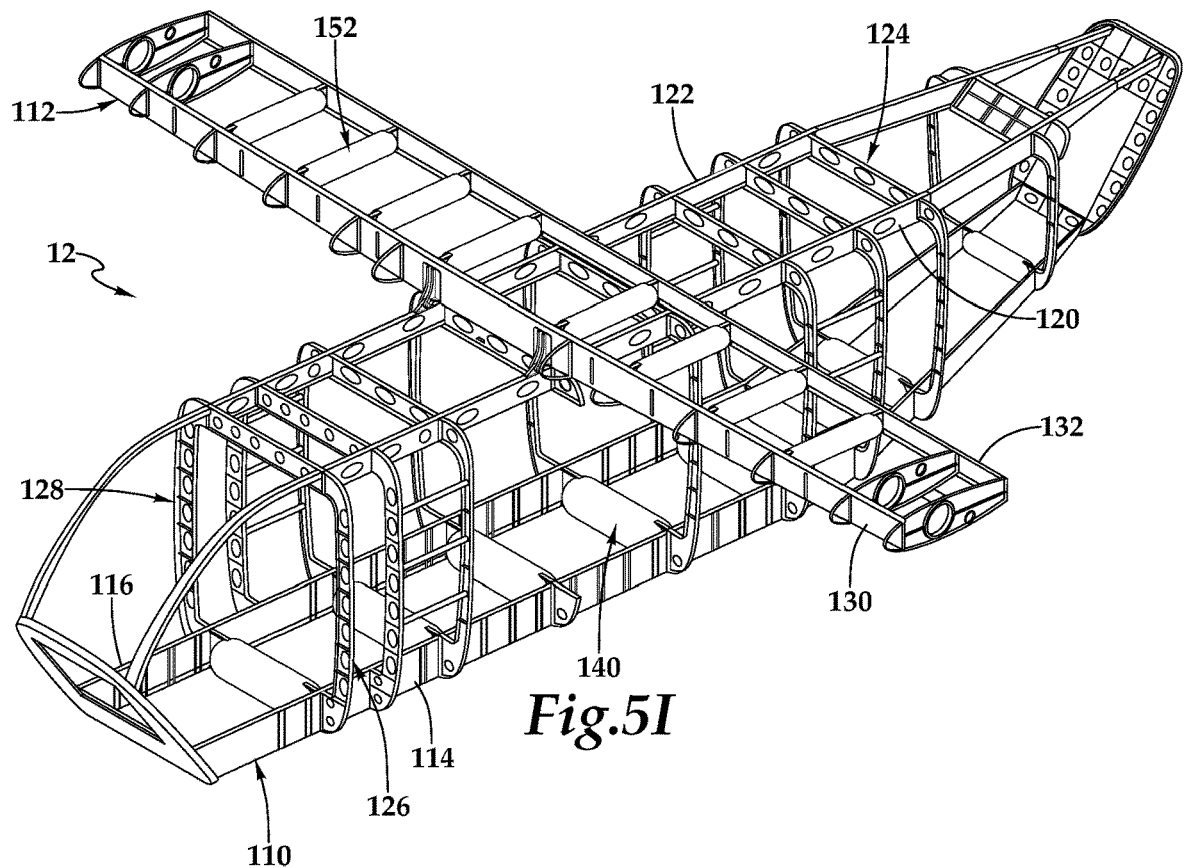
Figure 5J:
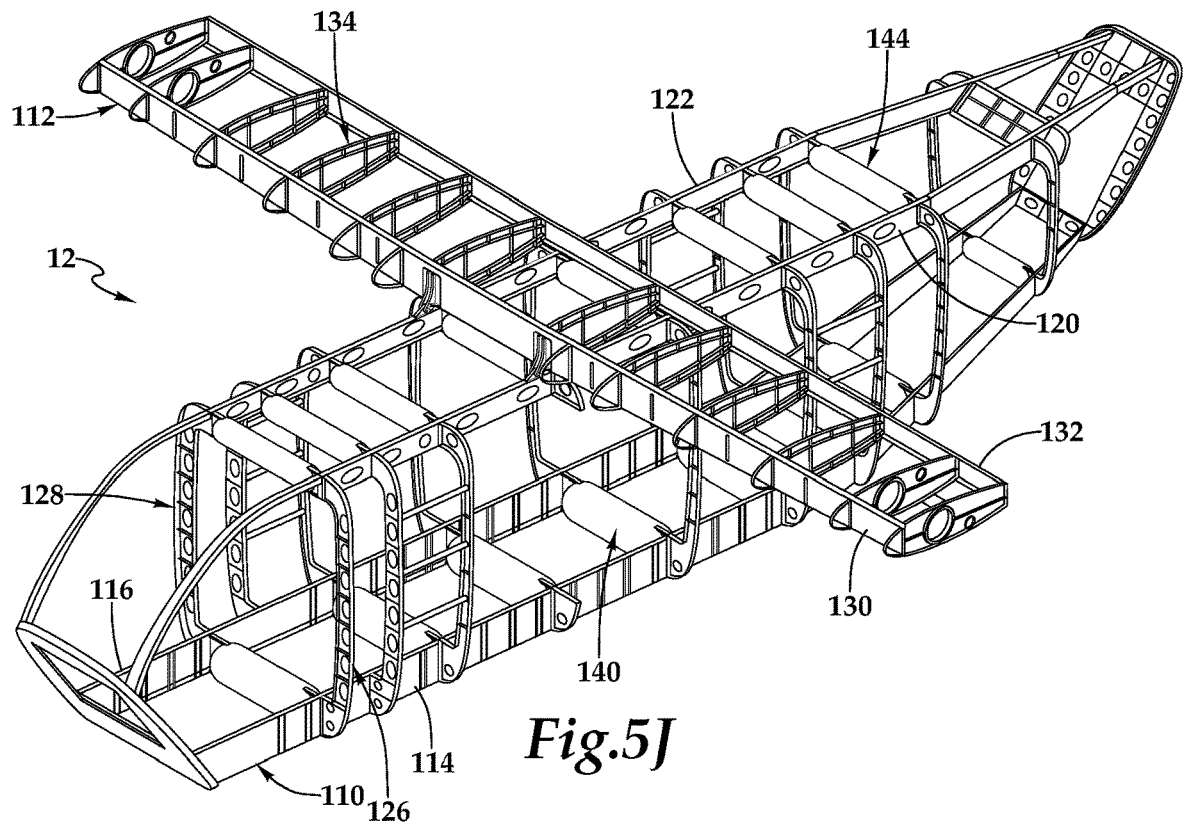

Referring additionally to FIG. 5H, certain structural components of airframe 12 in FIG. 5A have been replaced with fuel tanks of the present disclosure. Specifically, portions of forward wing spar 130 have been replaced with a plurality of fuel tanks, which will individually and collectively be referred to as forward wing spar fuel tanks 154. Wing spar fuel tanks 154 extend in the lateral direction between adjacent wing ribs 134 and form an integral part of wing airframe 112 acting as the forward wing spar such that wing spar fuel tanks 154 are subject to flight loads in addition to having fuel containment capabilities. Likewise, portions of aft wing spar 132 have been replaced with a plurality of fuel tanks, which will individually and collectively be referred to as aft wing spar fuel tanks 156. Wing spar fuel tanks 156 extend in the lateral direction between adjacent wing ribs 134 and form an integral part of wing airframe 112 acting as the aft wing spar such that wing spar fuel tanks 156 are subject to flight loads in addition to having fuel containment capabilities.

Even though the fuel tanks of the present disclosure have been depicted and described with reference to FIGS. 5B-5H as replacing a particular type of structural element in each embodiment, it should be understood by those having ordinary skill in the art that the fuel tanks of the present disclosure could replace any number of structural components in an airframe depending upon the fuel requirements. For example, in FIG. 5I, certain structural components of fuselage airframe 110 and wing airframe 112 have been replaced with fuel tanks of the present disclosure. Specifically, floor intercostals 118 have been replaced with floor intercostal fuel tanks 140 and wing ribs 134 have been replaced with wing rib fuel tanks 152, wherein floor intercostal fuel tanks 140 form an integral part of fuselage airframe 110 and wing rib fuel tanks 152 form an integral part of wing airframe 112. Similarly, in FIG. 5J, multiple structural components of fuselage airframe 110 have been replaced with fuel tanks of the present disclosure. Specifically, floor intercostals 118 have been replaced with floor intercostal fuel tanks 140 and roof intercostals 124 have been replaced with roof intercostal fuel tanks 144, wherein floor intercostal fuel tanks 140 and roof intercostal fuel tanks 144 form an integral part of fuselage airframe 110. As such, those having ordinary skill in the art will fully appreciate that the fuel tanks of the present disclosure could replace structural elements in an airframe in any number of combinations or permutations with such combinations and permutations being within the scope of the present disclosure.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A fuselage airframe subject to flight loads, the fuselage airframe comprising:
   first and second fore/aft floor beams having a plurality of floor intercostals laterally extending therebetween;
   first and second fore/aft roof beams having a plurality of roof intercostals laterally extending therebetween;
   a plurality of cabin frames extending between respective floor and roof beams; and
   a plurality of fuel tanks configured to contain a pressurized fuel, each of the fuel tanks having a cylindrical shape with an axis, each of the fuel tanks replacing at least a portion of one of the beams, the intercostals or the frames such that the fuel tanks are subject to the flight loads;
   wherein, the plurality of fuel tanks includes at least one beam fuel tank, at least one intercostal fuel tank and at least one frame fuel tank;
   wherein, the axis of the at least one beam fuel tank extends in a fore/aft direction of the airframe;
   wherein, the axis of the at least one intercostal fuel tank extends in a lateral direction of the airframe;
   wherein, the axis of the at least one frame fuel tank extends in a vertical direction of the airframe, such that the axes of the at least one beam fuel tank, the at least one intercostal fuel tank and the at least one frame fuel tank extend in three mutually perpendicular directions; and
   wherein, the fuel tanks, the beams, the intercostals and the frames each comprise a plurality of composite plies, each of the fuel tanks co-cured with one of the beams, the intercostals or the frames to form an integral connection therewith.

2. The fuselage airframe as recited in claim 1 wherein each of the fuel tanks further comprises a hydrogen fuel tank.

3. The fuselage airframe as recited in claim 1 wherein each of the fuel tanks further comprises a carbon fiber fuel tank.

4. The fuselage airframe as recited in claim 1 wherein each of the fuel tanks further comprises a carbon fiber fuel tank having an aluminum liner.

5. The fuselage airframe as recited in claim 1 wherein the at least one beam fuel tank further comprises a plurality of beam fuel tanks each having an axis that extends in the fore/aft direction of the fuselage airframe.

6. The fuselage airframe as recited in claim 1 wherein the at least one frame fuel tank further comprises a plurality of frame fuel tanks each having an axis that extends in the vertical direction of the fuselage airframe.

7. The fuselage airframe as recited in claim 1 wherein the at least one frame fuel tank extends between one of the floor beams and one of the roof beams.

8. The fuselage airframe as recited in claim 1 wherein the at least one beam fuel tank extends between two floor intercostals.

9. The fuselage airframe as recited in claim 1 wherein the at least one beam fuel tank extends between two roof intercostals.

10. An aircraft comprising:
    a fuselage airframe subject to flight loads, the fuselage airframe including:
    first and second fore/aft floor beams having a plurality of floor intercostals laterally extending therebetween;
    first and second fore/aft roof beams having a plurality of roof intercostals laterally extending therebetween;
    a plurality of cabin frames extending between respective floor and roof beams; and
    a plurality of fuel tanks configured to contain a pressurized fuel, each of the fuel tanks having a cylindrical shape with an axis, each of the fuel tanks replacing at least a portion of one of the beams, the intercostals or the frames such that the fuel tanks are subject to the flight loads, the plurality of fuel tanks including at least first and second fuel tanks; and
    a propulsion system supported by the fuselage airframe, the propulsion system including:
    a plurality of rotor systems each including a rotor assembly and an electric motor, the plurality of rotor systems including at least first and second rotor systems; and
    an electrical system including a plurality of fuel cells configured to provide electrical energy to the plurality of rotor systems, the plurality of fuel cells including at least first and second fuel cells, the first fuel cell coupled to the first fuel tank and configured to provide electrical energy to the first rotor system, the second fuel cell coupled to the second fuel tank and configured to provide electrical energy to the second rotor system, thereby providing redundancy to the propulsion system;
    wherein, the plurality of fuel tanks includes at least one beam fuel tank, at least one intercostal fuel tank and at least one frame fuel tank;
    wherein, the axis of the at least one beam fuel tank extends in a fore/aft direction of the airframe;
    wherein, the axis of the at least one intercostal fuel tank extends in a lateral direction of the airframe;
    wherein, the axis of the at least one frame fuel tank extends in a vertical direction of the airframe, such that the axes of the at least one beam fuel tank, the at least one intercostal fuel tank and the at least one frame fuel tank extend in three mutually perpendicular directions; and wherein, the fuel tanks, the beams, the intercostals and the frames each comprise a plurality of composite plies, each of the fuel tanks co-cured with one of the beams, the intercostals or the frames to form an integral connection therewith.

11. The aircraft as recited in claim 10 further comprising a wing airframe subject to flight loads, the wing airframe coupled to the fuselage airframe;

the wing airframe including:

forward and aft wing spars;

a plurality of wing ribs extending between the forward and aft wing spars; and at least one wing fuel tank configured to contain the pressurized hydrogen fuel, the at least one wing fuel tank replacing at least a portion of one of the spars or the ribs such that the at least one wing fuel tank is subject to the flight loads.

12. The fuselage airframe as recited in claim 1 wherein the at least one intercostal fuel tank extends between the first and second fore/aft floor beams.

13. The fuselage airframe as recited in claim 1 wherein the at least one intercostal fuel tank extends between the first and second fore/aft roof beams.

14. The aircraft as recited in claim 10 wherein the fuselage airframe supports a fuselage skin covering all of the fuel tanks.

* * * * *